US010559206B2

(12) United States Patent
Ohsawa et al.

(10) Patent No.: US 10,559,206 B2
(45) Date of Patent: Feb. 11, 2020

(54) MOBILE BODY SPATIAL INFORMATION CALCULATION APPARATUS AND COLLISION AVOIDANCE SYSTEM

(71) Applicant: Kabushiki Kaisha Toshiba, Minato-ku, Tokyo (JP)

(72) Inventors: Hiroyuki Ohsawa, Chiba (JP); Akihiro Imamura, Tokyo (JP); Kazuyasu Ohwaki, Tokyo (JP); Yutaka Oki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 33 days.

(21) Appl. No.: 15/686,193

(22) Filed: Aug. 25, 2017

(65) Prior Publication Data
US 2018/0268699 A1    Sep. 20, 2018

(30) Foreign Application Priority Data

Mar. 15, 2017    (JP) ................. 2017-049685

(51) Int. Cl.
*G08G 1/16* (2006.01)
*G08G 1/04* (2006.01)
(Continued)

(52) U.S. Cl.
CPC ............. *G08G 1/166* (2013.01); *B60W 30/09* (2013.01); *G01S 13/931* (2013.01);
(Continued)

(58) Field of Classification Search
CPC ..... G01S 2013/9342; G01S 2013/9346; G01S 2013/935; G01S 2013/9367; G08G 1/01;
(Continued)

(56) References Cited

U.S. PATENT DOCUMENTS

| 8,862,383 B2 | 10/2014 | Tsuchida |
| 9,798,002 B2 | 10/2017 | Baba |

(Continued)

FOREIGN PATENT DOCUMENTS

| JP | 2010-070047 A | 4/2010 |
| JP | 2014-029604 A | 2/2014 |

(Continued)

OTHER PUBLICATIONS

Japanese Office Action dated Nov. 5, 2019 in corresponding Japanese Patent Application No. 2017-049685 with English Translation thereof.

*Primary Examiner* — Atul Trivedi
(74) *Attorney, Agent, or Firm* — White & Case LLP

(57) ABSTRACT

A mobile body spatial information calculation apparatus according to an embodiment includes an input section configured to receive sensor information including information on one or more target objects based on a position of an own mobile body from a sensor apparatus, an object recognition section configured to recognize the target object based on the sensor information, a calculation section configured to calculate a collision prediction time and a target portion angle based on the sensor information on the target object recognized by the object recognition section, and a spatial information generation section configured to generate spatial information according to the collision prediction time and the target portion angle using the collision prediction time and the target portion angle calculated by the calculation section and store the generated spatial information.

19 Claims, 23 Drawing Sheets

(51) Int. Cl.
  *G08G 1/01* (2006.01)
  *G01S 13/93* (2006.01)
  *B60W 30/09* (2012.01)
  *G01S 13/931* (2020.01)
(52) U.S. Cl.
  CPC ......... *G08G 1/0112* (2013.01); *G08G 1/0141* (2013.01); *G08G 1/04* (2013.01); *G08G 1/165* (2013.01); *G01S 2013/9318* (2020.01); *G01S 2013/9319* (2020.01); *G01S 2013/9323* (2020.01); *G01S 2013/93185* (2020.01)
(58) Field of Classification Search
  CPC ...... G08G 1/0112; G08G 1/0141; G08G 1/04; G08G 1/166
  USPC ........................................................ 701/301
  See application file for complete search history.

(56) References Cited

U.S. PATENT DOCUMENTS

| | | | |
|---|---|---|---|
| 9,824,586 B2 | 11/2017 | Sato et al. | |
| 2007/0021915 A1* | 1/2007 | Breed | B60N 2/2863 701/301 |
| 2007/0112514 A1 | 5/2007 | Ekmark et al. | |
| 2008/0172156 A1* | 7/2008 | Joh | G01S 13/723 701/45 |
| 2010/0253598 A1* | 10/2010 | Szczerba | G01S 13/723 345/7 |
| 2011/0301845 A1* | 12/2011 | Harada | B60R 21/0134 701/301 |
| 2013/0238192 A1* | 9/2013 | Breu | G01S 13/726 701/41 |
| 2014/0005875 A1* | 1/2014 | Hartmann | B60W 10/06 701/23 |
| 2015/0183431 A1* | 7/2015 | Nanami | B60W 40/04 701/301 |
| 2015/0298621 A1* | 10/2015 | Katoh | B60R 11/04 348/148 |
| 2015/0371095 A1* | 12/2015 | Hartmann | G06K 9/00791 348/148 |
| 2017/0008521 A1* | 1/2017 | Braunstein | G01C 21/32 |
| 2017/0018186 A1* | 1/2017 | Probert | G08G 1/163 |
| 2017/0050627 A1* | 2/2017 | Lee | B60T 8/17558 |
| 2017/0210359 A1* | 7/2017 | Brandin | B60T 7/22 |
| 2017/0274821 A1* | 9/2017 | Goudy | B60Q 9/008 |
| 2017/0278401 A1* | 9/2017 | Probert | G08G 1/167 |
| 2017/0287332 A1* | 10/2017 | Ranninger Hernandez | G08G 1/005 |
| 2018/0056998 A1* | 3/2018 | Benosman | B60W 30/0956 |
| 2018/0259339 A1* | 9/2018 | Johnson | G01C 21/005 |
| 2019/0098953 A1* | 4/2019 | Strickland | A42B 3/0426 |

FOREIGN PATENT DOCUMENTS

| | | |
|---|---|---|
| JP | 2014-115887 A | 6/2014 |
| JP | 2014-122873 A | 7/2014 |
| JP | 5709048 B2 | 4/2015 |
| WO | 2014-162941 A1 | 10/2014 |

\* cited by examiner

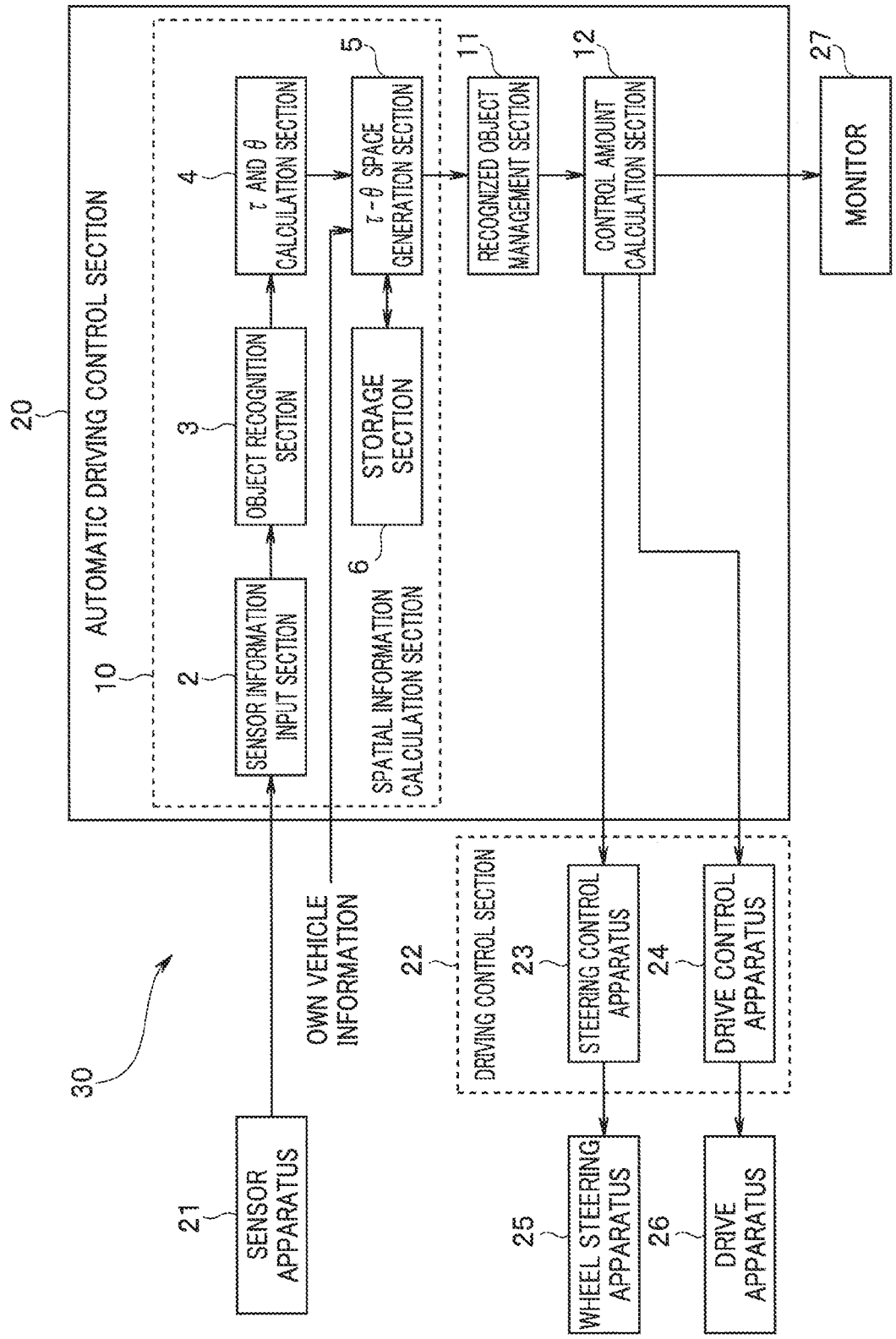

MOBILE BODY SPATIAL INFORMATION CALCULATION APPARATUS AND COLLISION AVOIDANCE SYSTEM

This application is based upon and claims the benefit of priority from the prior Japanese Patent Applications No. 2017-049685, filed on Mar. 15, 2017; the entire contents of which are incorporated herein by reference.

FIELD

Embodiments of the present invention relate to a mobile body spatial information calculation apparatus and a collision avoidance system.

BACKGROUND

Conventionally, driving support systems for supporting driving of mobile bodies such as vehicles are being developed. Driving support systems are intended to assist driving using a computer based on information acquired from a radar or camera mounted on a vehicle or the like. For example, a collision avoidance system gives assistance to avoid a collision by observing surrounding of a vehicle, issuing a warning to a driver or operating a brake or steering wheel on behalf of the driver whenever there is a possibility of collision. There is a possibility that adopting such a collision avoidance system will prevent accidents beforehand and drastically improve safety of vehicles.

The collision avoidance system projects a target object having a possibility of being collided into a metric space (XY space) using information acquired by a camera or a sensor such as a radar and executes path planning on the metric space to avoid a collision with an obstacle and guide the vehicle to an optimum path. A vehicle-mounted collision avoidance system needs to execute path planning in real time under various environments and requires hardware with sufficient processing capability.

However, XY space conversion processing that projects sensor input into the metric space requires an enormous amount of calculation, which poses a problem of adversely affecting the performance of the collision avoidance system.

BRIEF DESCRIPTION OF THE DRAWINGS

FIG. 1A is a block diagram illustrating a collision avoidance system including a mobile body spatial information calculation apparatus according to a first embodiment;

DETAILED DESCRIPTION

A mobile body spatial information calculation apparatus according to an embodiment includes an input section configured to receive sensor information including information on one or more target objects based on a position of an own mobile body from a sensor apparatus, an object recognition section configured to recognize the target object based on the sensor information, a calculation section configured to calculate a collision prediction time and a target portion angle based on the sensor information on the target object recognized by the object recognition section, and a spatial information generation section configured to generate spatial information including the collision prediction time and the target portion angle using the collision prediction time and the target portion angle calculated by the calculation section and store the generated spatial information.

Hereinafter, embodiments will be described in detail with reference to the accompanying drawings.

First Embodiment

Figure 1B:
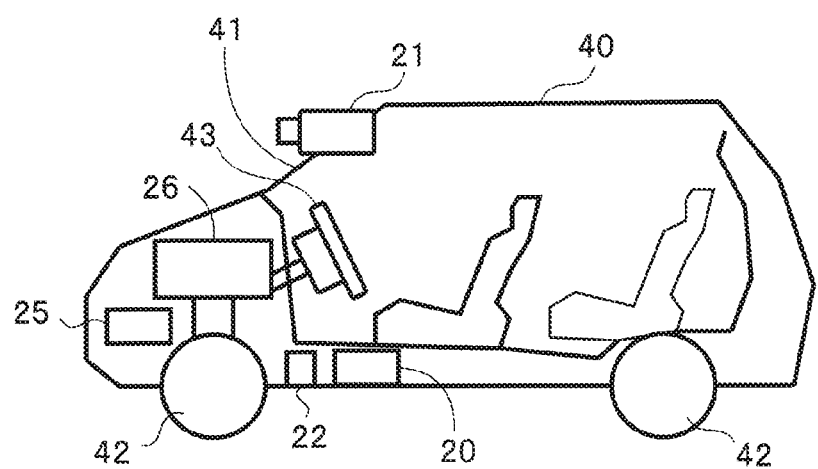
FIG. 1B is an explanatory diagram illustrating an automobile, which is an example of a mobile body.

FIG. 1A is a block diagram illustrating a collision avoidance system including a mobile body spatial information calculation apparatus according to a first embodiment. FIG. 1B is an explanatory diagram illustrating an automobile mounted with a collision avoidance system. In FIG. 1A and FIG. 1B, the same components are assigned the same reference numerals. Although the present embodiment takes an automobile as an example of a mobile body, the present embodiment is not limited to an automobile. For example, the present embodiment is also applicable to a mobile robot.

Some of related arts of a collision avoidance system use, for example, a lidar apparatus or an image sensor. Each of such related arts acquires point cloud data of another vehicle using sensor information of a lidar apparatus mounted on the own vehicle and projects the point cloud data into a metric space (XY space) through ray casting processing. The point cloud data is then subjected to path planning in the XY space into which the point cloud data is projected. That is, mapping in the related arts converts angle information acquired from the sensor information to an XY space, and so mapping requires an enormous amount of calculation. Note that when it is not possible to avoid a collision with the other vehicle using the brake, the related art further requires processing of converting the information of path planning acquired from the XY space to information of a steering angle.

On the other hand, the collision avoidance system according to the present embodiment adopts a r-θ space using a τ margin corresponding to TTC (time to clash) which is a collision prediction time with respect to a target object such as another vehicle and an angle (hereinafter referred to as "target portion angle") indicating a direction in which each part of the target object (hereinafter referred to as a "target portion") is located using a traveling direction of the own vehicle as a reference. The mobile body spatial information calculation apparatus of the collision avoidance system according to the present embodiment performs mapping from sensor information of a sensor mounted on the own vehicle to the τ-θ space.

The amount of calculation required for mapping to the τ-θ space in the present embodiment is extremely small compared to mapping to the XY space in the related art. Furthermore, since a conversion between the target portion angle θ and the steering angle is relatively easy, even when it is not possible to avoid a collision with the other vehicle using the brake, the processing of converting the information of the path planning acquired from the τ-θ space to the information of the steering angle can be calculated with an extremely small amount of calculation.

Figure 2:
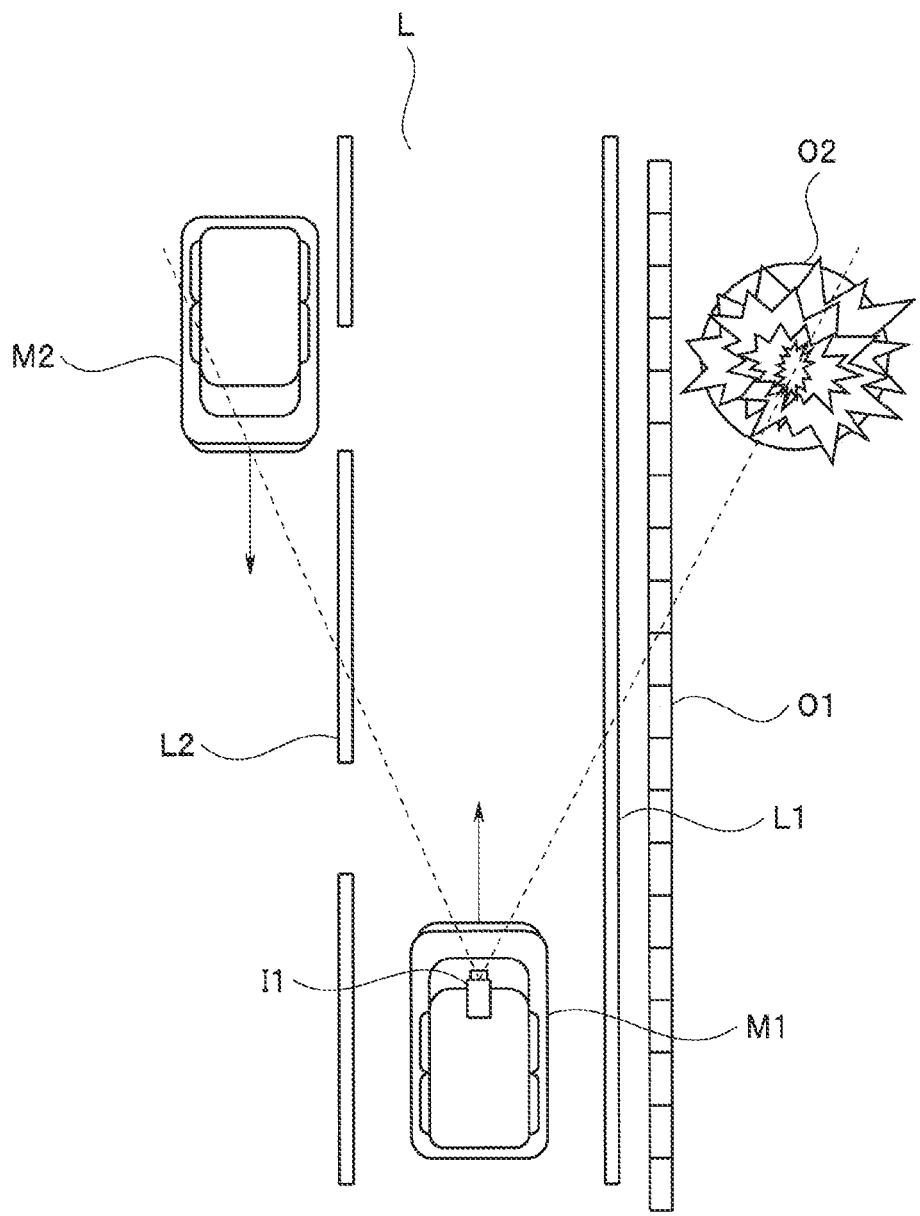
FIG. 2 is an explanatory diagram for describing a $\tau$-$\theta$ space according to the first embodiment.
Figure 3:
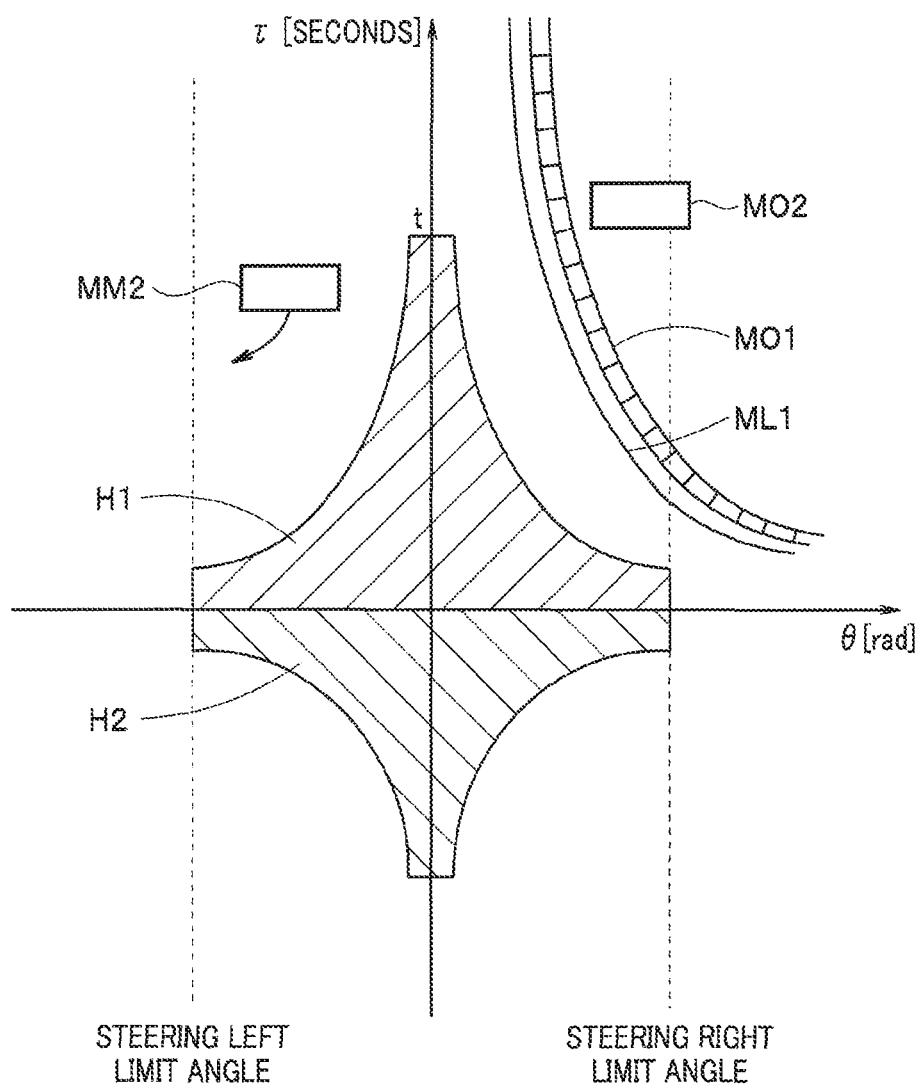
FIG. 3 is an explanatory diagram for describing the $\tau$-$\theta$ space according to the first embodiment.

FIG. 2 and FIG. 3 are explanatory diagrams for describing the τ-θ space according to the present embodiment. FIG. 2 illustrates a positional relationship between the own vehicle and a target object such as another vehicle or an obstacle viewed from above and FIG. 3 illustrates the τ-θ space corresponding to FIG. 2.

The example in FIG. 2 shows that an own vehicle M1 is traveling on a traveling lane on a road L between a roadway outside line L1 and a center line L2 in a direction shown by an arrow. Furthermore, another vehicle M2 is located on an opposite lane beyond the center line L2 and the other vehicle M2 is traveling in a direction shown by an arrow. A wall O1 is provided outside the roadway outside line L1 and trees O2 are planted outside the wall O1.

The own vehicle M1 is provided with an image sensor 11 configured to take images within a predetermined view range in the traveling direction. A τ-θ space is generated using the sensor information acquired from the image sensor I1.

The τ-θ space shown in FIG. 3 displays a collision prediction time r in the vertical axis and a target portion angle θ in the horizontal axis, plotting each position of a target object with respect to the own vehicle. That is, FIG. 3 is generated by mapping the sensor information to the τ-θ space. The mapping is performed with an extremely small amount of calculation by calculating a r margin and a target portion angle from the sensor information and plotting the calculated values in the τ-θ space.

In the τ-θ space in FIG. 3, a line in which the collision prediction time τ and the target portion angle θ are 0 represents the position of the own vehicle (image sensor I1). Furthermore, the collision prediction time axis (hereinafter referred to as "time axis") represents the traveling direction of the own vehicle. The other vehicle M2 is represented by "other vehicle MM2" in the τ-θ space.

The τ-θ space expresses a positional relationship when it is assumed that the own vehicle and the target object are relatively in the state of uniform linear motion. The time axis direction indicates not only the distance information between the own vehicle and the target object but also the τ margin including information on a relative speed, and the collision prediction time can be easily known from the value of the vertical axis of the τ-θ space.

The target objects such as the roadway outside line L1 and the wall O1, which are substantially straight lines, are expressed in the τ-θ space by a roadway outside line ML1 and a wall MO1 which are curved lines, the target portion angle of which decreases as the collision prediction time increases. Similarly, the traveling direction of the other vehicle M2 in the τ-θ space has a curved shape as indicated by an arrow attached to the other vehicle MM2.

That is, in a supposed case where the own vehicle and the target object are relatively in the state of uniform linear motion in a parallel direction, the τ-θ space corresponds to a change in the positional relationship between the target object and the own vehicle with the passage of time, is similar to a state of an image picked up by a camera or the like, allowing the driver of the own vehicle to easily intuit the collision prediction time and the target object position.

Using the time at which the state of the τ-θ space in FIG. 3 is obtained as a reference, a region where the own vehicle is located until t seconds later can be expressed by a shaded area in FIG. 3. The current target portion angle θ of the own vehicle is distributed over a wide angle range in the vicinity of the own vehicle position and the target portion angle θ of the own vehicle t seconds later is distributed over a relatively narrow angle range in the vicinity of the traveling direction. In other words, a region H1 in FIG. 3 represents a region where the own vehicle is located when the own vehicle travels at a predetermined speed, that is, a collision possibility range. Note that a region H2 in FIG. 3 represents a collision possibility range when the own vehicle moves backward at a predetermined speed. Hereinafter, the collision possibility range will be simply referred to as a "collision range."

In the present embodiment, the speed and the traveling direction of the own vehicle are controlled so that the target object is not included in the collision range. Note that it is possible to generate a τ-θ space in which sensor information is corrected, for example, in accordance with the steering angle of the own vehicle.

The collision avoidance system 30 in FIG. 1A includes a sensor apparatus 21 attached to an automobile 40 shown in FIG. 1B. The sensor apparatus 21 acquires and outputs physical information (sensor information) related to the target object. The sensor apparatus 21 can be a variety of sensors such as a camera that acquires optical information of the target object, a lidar apparatus or a radar apparatus that acquires information on a distance to or an angle of the target object. FIG. 1B illustrates an example where one sensor apparatus 21 is attached to a top of a front glass 41, but the installation location and the number of sensor apparatuses 21 can be set as appropriate, and, for example, a sensor for checking not only the forward direction but also the backward or sideward direction may be adopted.

A driving control section 22, a wheel steering apparatus 25 and a drive apparatus 26 shown in FIG. 1B are similar to a drive mechanism mounted on a common automobile. The driving control section 22 includes a steering control apparatus 23 and a drive control apparatus 24. The wheel steering apparatus 25 changes the orientation of wheels 42. Note that the steering control apparatus 23 drives the wheel steering apparatus 25 based on the operation of the steering wheel 43, and can thereby change the front and/or back wheels 42 toward a desired direction. Furthermore, the steering control apparatus 23 drives the wheel steering apparatus 25 according to a control signal from the automatic driving control section 20 and can change the wheel 42 in a desired direction.

Note that an automatic driving control section 20 and the driving control section 22 may be configured by a processor such as a CPU or operated by a program stored in a memory, which is not shown, to implement various functions.

The drive apparatus 26 such as an engine or a motor causes the wheels 42 to rotate and can cause the automobile 40 to move forward or backward. The drive control apparatus 24 drives the drive apparatus 26 according to a control signal from the automatic driving control section 20, and can control rotation of the wheels 42. Furthermore, the automobile 40 is provided with an accelerator pedal, which is not shown, and the drive control apparatus 24 controls the drive apparatus 26 based on the operation of the accelerator pedal by the driver, and can control a rotation speed or the like of the wheels 42.

The automatic driving control section 20 shown in FIG. 1A is constructed of a spatial information calculation section 10, a recognized object management section 11 and a control amount calculation section 12. The spatial information calculation section 10 is constructed of a sensor information input section 2, an object recognition section 3, a $\tau$ and $\theta$ calculation section 4, a $\tau$-$\theta$ space generation section 5 and a storage section 6.

Sensor information from the sensor apparatus 21 is given to the sensor information input section 2. The sensor information input section 2 sequentially outputs the sensor information inputted at a predetermined rate to the object recognition section 3. The object recognition section 3 recognizes each object such as a person, vehicle or obstacle as a target object based on the sensor information. For example, the object recognition section 3 recognizes the shape of an object based on the sensor information, compares it with shapes and features of various objects stored in a memory which is not shown, and recognizes the object as a target object. Alternatively, the object recognition section 3 may also recognize the shape of the moving direction front side of a mobile body in an image. Furthermore, the object recognition section 3 may also recognize a shape portion obtained from, for example, a front view or back view of an automobile as a target object. The object recognition section 3 outputs information on the recognized object (target object) to the $\tau$ and $\theta$ calculation section 4. When a picked-up image is inputted as the sensor information, the object recognition section 3 may output coordinate information of the target object on an image and information on a view angle to the $\tau$ and $\theta$ calculation section 4.

The $\tau$ and $\theta$ calculation section 4 calculates a $\tau$ margin about the object recognized by the object recognition section 3 using the inputted sensor information. The $\tau$ margin indicates a time allowance until the own vehicle and the target object collide with each other if both keep the current relative speed. When the own vehicle and the target object relatively perform uniform linear motion, the $\tau$ margin can be expressed by the following equation (1) using a view angle (hereinafter referred to as "target object view angle") $\phi$ when the target object is viewed from the own vehicle. The equation (1) shows that the $\tau$ margin can be calculated using the target object view angle $\phi$ and a time derivative value thereof.

$$\tau = \phi/(d\phi/dt) \quad (1)$$

Furthermore, a document (Real-time time-to-collision from variation of Intrinsic (written by Amaury Negre, Clistophe Braillon, Jim Crowley, Christian Laugier)) shows that the $\tau$ margin can be calculated by the following equation (2). Note that in equation (2), "Z" denotes a distance and "s" denotes the size of a target object.

$$\tau = -Z/(Z/dt) = s/(s/dt) \quad (2)$$

Figure 4:
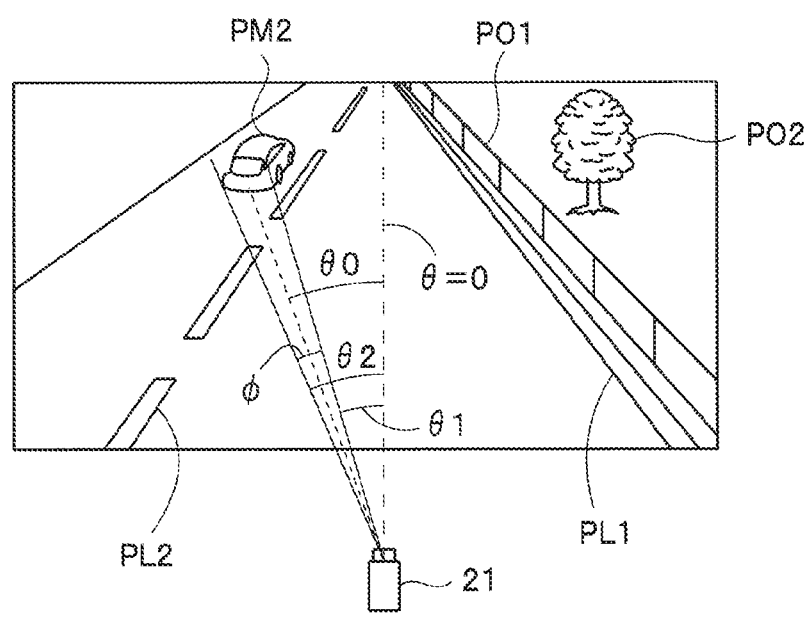
FIG. 4 is an explanatory diagram illustrating an example of an image of a front side of a linear traveling direction picked up by a camera.

For example, the $\tau$ and $\theta$ calculation section 4 calculates the $\tau$ margin through calculation in the above equations (1) and (2) or the like. For example, suppose an angle of view (view range) of the sensor apparatus 21 fixed to the automobile is known. FIG. 4 is an explanatory diagram illustrating an example of a picked-up image in the traveling direction and illustrates an image corresponding to FIG. 2. That is, the roadway outside line L1, the center line L2, the other vehicle M2, the wall O1 and the trees O2 in FIG. 2 are expressed by image portions PL1, PL2, PM2, PO1 and PO2 in FIG. 4, respectively. The target object view angle of the other vehicle M2 is an angle $\phi$ in FIG. 4. A line with $\theta=0$ in FIG. 4 represents the traveling direction of the own vehicle.

The view range of the sensor apparatus 21 is, for example, a known predetermined range with the traveling direction, which is a direction of a roll axis of the own vehicle M1, as a reference. The direction of the target object seen from the sensor apparatus 21 can be expressed by an angle with the traveling direction as a reference. Since the view range of the sensor apparatus 21 is known, each coordinate position in a picked-up image and an angle with respect to the traveling direction have a one-to-one correspondence. Therefore, it is possible to easily calculate the target object view angle $\phi$ from the coordinate position of the target object in the picked-up image.

For example, the $\tau$ and $\theta$ calculation section 4 uses a table that describes a correspondence relation between the coordinate position in the picked-up image and an angle with respect to the traveling direction. The $\tau$ and $\theta$ calculation section 4 may calculate the target object view angle $\phi$ with reference to the table using the output of the object recognition section 3.

Furthermore, the $\tau$ and $\theta$ calculation section 4 calculates the target object view angle $\phi$ and its time derivative value using picked-up images sequentially inputted at a predetermined frame rate, and calculates the $\tau$ margin through calculation in the above equation (1).

Furthermore, the $\tau$ and $\theta$ calculation section 4 calculates the target portion angle $\theta$ of the target object with respect to the own vehicle. The target portion angle $\theta$ can be expressed by an angle using the traveling direction as a reference. The target portion angle $\theta$ can be calculated from coordinate positions of respective portions of the target object in the picked-up image.

The $\tau$ and $\theta$ calculation section 4 may designate the traveling direction in the image as a representative target portion angle $\theta 0$ and assume that a predetermined angle range around the representative target portion angle $\theta 0$ corresponds to the target object. For example, when the target object is an automobile, the target object may be assumed to be located within a range between target portion angles $\theta 1$ and $\theta 2$ at both ends of the front part (target object view angle 4).

Note that the representative target portion angle θ0 may be considered as an angle indicating the direction of the target object using the traveling direction of the own vehicle as a reference (hereinafter referred to as "target portion angle"). That is, regarding a known object such as an automobile, a target object of a known size may be arranged in the angle direction of the representative target portion angle θ0 in the τ-θ space and the τ-θ space may be expressed as a space based on the τ margin and the target portion angle.

Thus, the τ and θ calculation section 4 can calculate the τ margin and the target portion angle through simple calculation with an extremely small amount of calculation. The τ margin and the target portion angle are supplied to the τ-θ space generation section 5.

Note that the τ and θ calculation section 4 may also calculate the τ margin using not only the above equations (1) and (2) but also various publicly known techniques. For example, when an SfM (structure from motion) technique for forming a 3D image from a 2D image is adopted, it is possible to calculate the τ margin in the process of determining an arrangement of pixels on the image in a 3D space. Furthermore, when the sensor apparatus 21 is constructed of a lidar apparatus or the like, the τ and θ calculation section 4 may directly acquire the target portion angle θ from the output of the object recognition section 3. Note that when the τ margin is calculated by adopting the lidar apparatus or SfM, the target object need not be a specific person or object, but the τ margin may be calculated assuming respective points or a set of predetermined points as the object.

Figure 5:
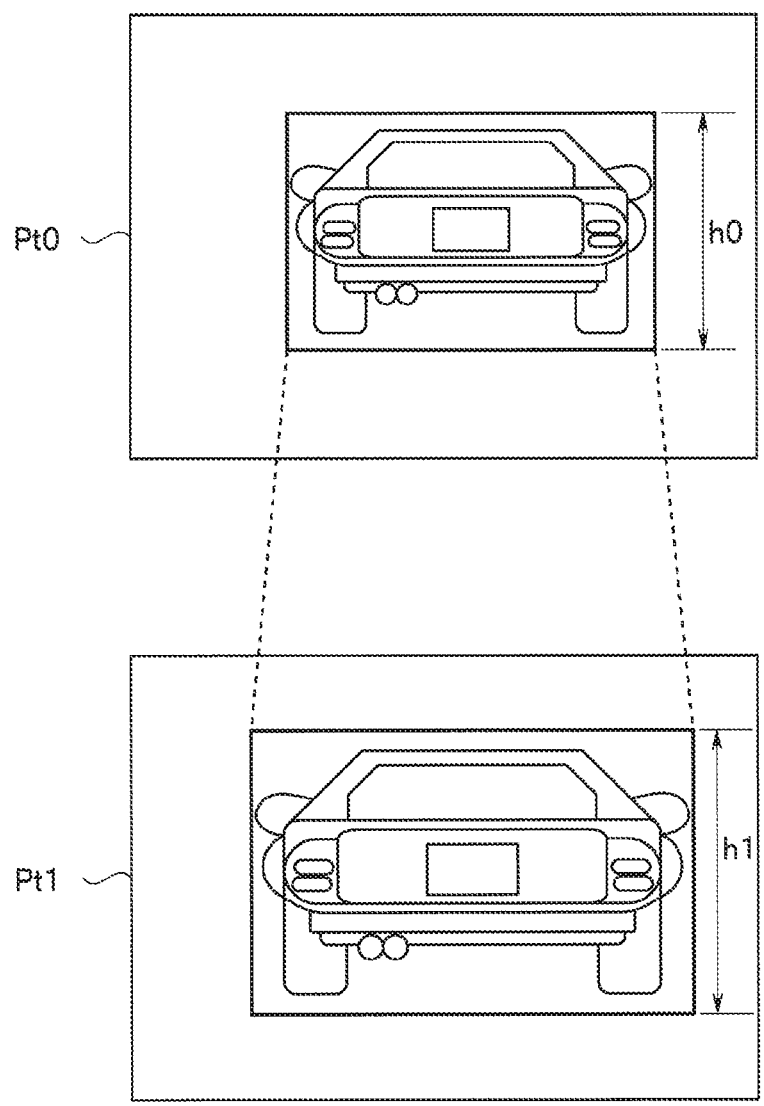
FIG. 5 is an explanatory diagram for describing another method of calculating a s margin in the $\tau$ and $\theta$ calculation section 4.

FIG. 5 is an explanatory diagram for describing another method of calculating a τ margin in the τ and θ calculation section 4. A change in the target object view angle φ is equal to a variation in size of a target object in a picked-up image. FIG. 5 illustrates a picked-up image Pt0 at time t0 and a picked-up image Pt1 at time t1 (=t0+Δt). Images of the same automobile are picked up as picked-up images Pt0 and Pt1, and the size (height) of the automobile changes from h0 to h1. In this case, the τ margin is proportional to h0/h1. That is, the τ margin can be calculated based on a variation in size of the target object in the picked-up images as shown in the above equation (2). It is possible to calculate the τ margin using this technique as in the case of the above equation (1) without calculating an actual scale of the object, a relative distance to the object or a relative speed.

The τ-θ space generation section (spatial information generation section) 5 plots the τ margin and the target portion angle in the τ-θ space. The τ-θ space generation section 5 acquires information on the own vehicle M1 and generates τ-θ spatial information including information on a collision range. Note that the own vehicle information may include speed information of the own vehicle, steering-related information or the like. For example, the own vehicle information can be acquired from the driving control section 22. The τ-θ space generation section 5 causes the storage section 6 to store the generated τ-θ spatial information. The τ-θ space generation section 5 supplies the τ-θ spatial information to the recognized object management section 11.

Note that FIG. 1A shows an example where own vehicle information is inputted to the τ-θ space generation section 5 from outside of the automatic driving control section 20, but it is also possible to calculate the own vehicle information using the sensor information inputted to the sensor information input section 2 using, for example, a publicly known technique such as the aforementioned SfM. In this case, the input of the own vehicle information from outside of the automatic driving control section 20 can be omitted.

Thus, the spatial information calculation section 10 calculates the τ margin and the target portion angle with a small amount of calculation and performs mapping from the output of the sensor apparatus 21 to the τ-θ space through the processing of plotting the calculated τ margin and target portion angle in the τ-θ space. That is, the mapping in the spatial information calculation section 10 in the present embodiment can be performed with an extremely small amount of calculation compared to the mapping from optical information to an XY space according to the related art.

The recognized object management section 11 manages the collision prediction time, that is, successively changing τ-θ spatial information for each target object in the τ-θ space and outputs the τ-θ spatial information to the control amount calculation section 12. The control amount calculation section 12 determines the position of each target object, collision possibility or the like with respect to the momentarily changing own vehicle based on the τ-θ spatial information for each target object.

The control amount calculation section 12 executes path planning using the τ-θ spatial information. That is, when the target object is an object having a possibility of collision, the control amount calculation section 12 calculates an amount of control to avoid a collision with the target object and outputs the amount of control as a steering control signal and a speed control signal. The steering control signal is intended to control an amount of steering, that is, the orientation of the wheels 42 that define the traveling direction of the automobile 40 and is supplied to the steering control apparatus 23. The speed control signal is intended to control the rotation speed of the wheels 42 that define the speed of the automobile 40, and is supplied to the drive control apparatus 24.

Figure 6:
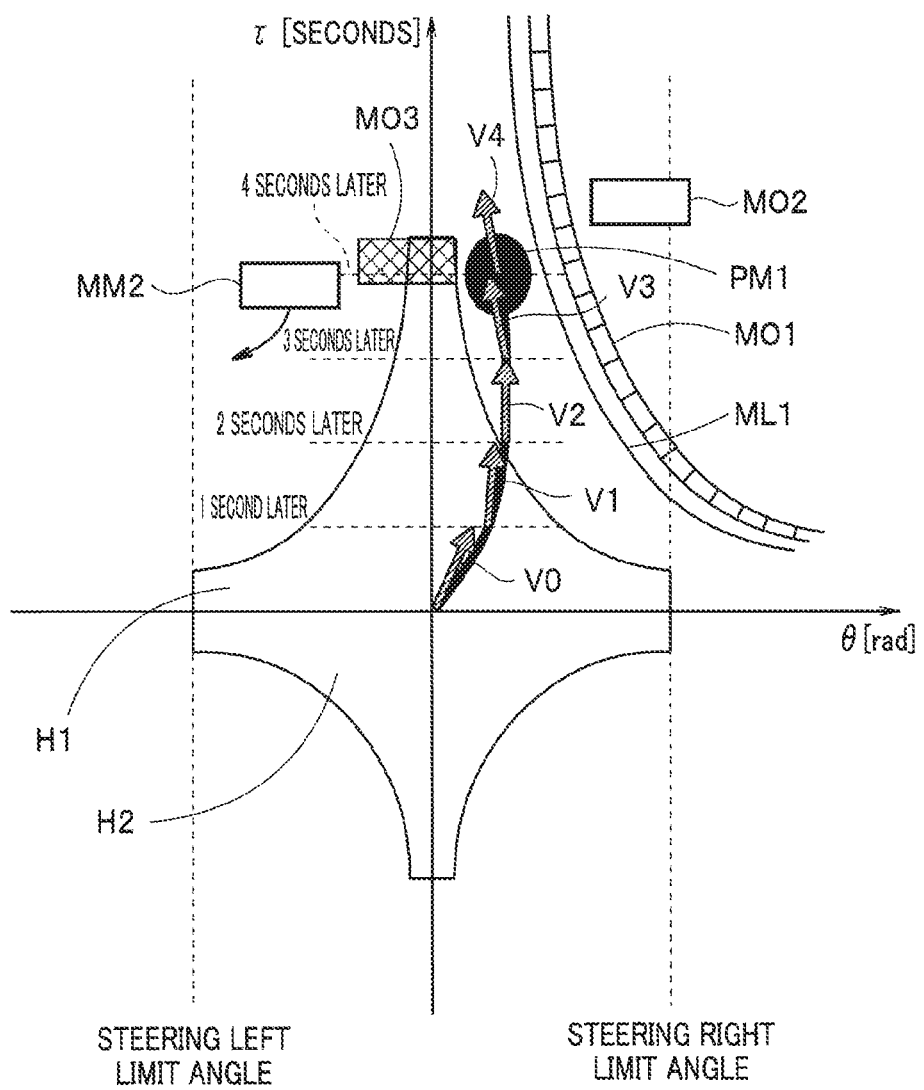
FIG. 6 is an explanatory diagram illustrating an example of a technique for calculating a control amount in a control amount calculation section 12.

FIG. 6 is an explanatory diagram illustrating an example of a technique of calculating the amount of control in the control amount calculation section 12. FIG. 6 illustrates an example where an obstacle MO3 appears in the τ-θ space in FIG. 3, and also illustrates collision ranges H1 and H2 from the present time until approximately 4.5 seconds later. Part of the obstacle MO3 is included in the collision range H1. FIG. 6 shows that when the own vehicle and the obstacle MO3 are in the state of relatively uniform linear motion, the own vehicle will collide with the obstacle MO3 approximately 4 seconds later.

When the control amount calculation section 12 is informed with the τ-θ spatial information that the obstacle MO3 exists within the collision range H1, the control amount calculation section 12 sets an arrival target region (painted-out region) PM1 of the own vehicle at a position where there will be no collision with the obstacle MO3 or the other target object at a time at which a collision is estimated to occur. Next, the control amount calculation section 12 determines a steering direction at every predetermined interval to reach the arrival target region PM1. The example in FIG. 6 shows steering directions V0 to V4 at every second. The own vehicle reaches the arrival target region PM1 after passing a route shown by a thick line in FIG. 6.

Note that the example in FIG. 6 shows a steering angle at every predetermined time at the present time, but the τ-θ spatial information is actually sequentially updated, and the arrival target region PM1 and the steering angle at each time are also recalculated. Although an example where the relative speed between the own vehicle and the obstacle MO3 is constant has been described, the speed may be changed. For example, the speed of the own vehicle may be reduced so as to reduce the relative speed. In this case, the collision range H1 becomes a narrower range in the time axis direction, which increases a time allowance before a collision and increases the setting range of the arrival target region PM1 as well. Furthermore, the steering angle to be set may be relatively smaller.

Note that although the present embodiment has described an example where an amount of control is calculated to avoid a collision with a target object located within a collision range and the speed or steering angle is automatically controlled, a display or an alarm such as warning sound may be generated to indicate the presence of a target object within the collision range. The control amount calculation section 12 can generate a signal for displaying the presence of a target object, a collision avoidance method or generating an alarm for the driver using a warning sound or voice. The monitor 27 outputs a video and sound based on the inputted signal.

Figure 7:
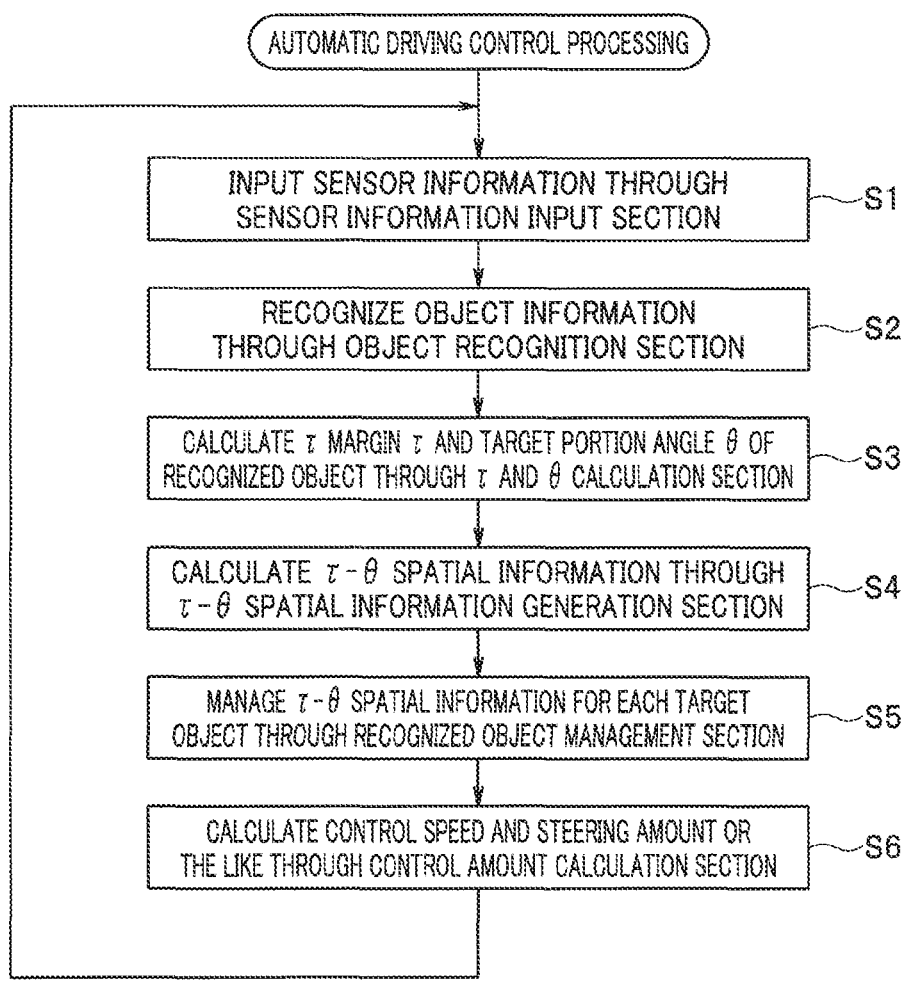
FIG. 7 is a flowchart for describing operation of the first embodiment.

Next, operation of the present embodiment will be described with reference to FIG. 7. FIG. 7 is a flowchart for describing operation of the automatic driving control section 20.

Suppose the own vehicle is running at a predetermined speed now. The sensor apparatus 21 acquires sensor information on objects around the own vehicle at a predetermined rate. The sensor information is sequentially inputted to the sensor information input section 2 and outputted to the object recognition section 3 (S1). The object recognition section 3 recognizes various objects as target objects based on the inputted sensor information and outputs the information on the target object to the $\tau$ and $\theta$ calculation section 4 (S2).

Regarding the target object, the $\tau$ and $\theta$ calculation section 4 calculates a $\tau$ margin and a target portion angle in the case where the own vehicle and the target object keep the current speeds using the inputted information and outputs the $\tau$ margin and the target portion angle to the $\tau$-$\theta$ space generation section 5 (S3).

The $\tau$-$\theta$ space generation section 5 generates a $\tau$-$\theta$ space by plotting the $\tau$ margin and the target portion angle, and causes the storage section 6 to store the $\tau$-$\theta$ spatial information (S4). The $\tau$-$\theta$ space generation section 5 may also acquire own vehicle information and generate $\tau$-$\theta$ spatial information including information on the collision range. The $\tau$-$\theta$ spatial information is supplied to the recognized object management section 11.

The spatial information calculation section 10 performs mapping from the output of the sensor apparatus 21 to the $\tau$-$\theta$ space through processing with an extremely small amount of calculation of calculating the $\tau$ margin and the target portion angle and plotting the calculated $\tau$ margin and target portion angle.

The recognized object management section 11 manages a collision prediction time for each target object (S5). The recognized object management section 11 outputs successively changing $\tau$-$\theta$ spatial information to the control amount calculation section 12 for each target object.

The control amount calculation section 12 determines a position and a collision possibility or the like of each target object with respect to the momentarily changing own vehicle according to the $\tau$-$\theta$ spatial information of each target object and determines the traveling direction and the speed to avoid a collision. The control amount calculation section 12 supplies a steering amount control signal for obtaining the determined traveling direction and a speed control signal for obtaining the determined speed to the driving control section 22.

The steering control apparatus 23 drives the wheel steering apparatus 25 based on the steering control signal and controls the orientation of the wheels 42. The drive control apparatus 24 drives the drive apparatus 26 based on the speed control signal and controls the rotation speed of the wheels 42. Thus, traveling of the own vehicle is automatically controlled so as to avoid obstacles.

Note that FIG. 7 has shown an example where operation of avoiding a collision with a target object having a possibility of collision is automatically performed based on the $\tau$-$\theta$ spatial information, but the possibility of collision may also be informed to the driver through a display of warning or an alarm. The $\tau$-$\theta$ space in FIG. 3 or FIG. 6 or the like may be displayed whenever a target object having a possibility of collision is found or all the time to let the driver know the possibility of collision or the like.

In this way, the present embodiment generates $\tau$-$\theta$ spatial information by plotting the collision prediction time and the target portion angle calculated based on sensor information. The collision prediction time and the target portion angle can be calculated with an extremely small amount of calculation and the amount of calculation required for mapping from sensor information to the $\tau$-$\theta$ space is extremely small. This makes it possible to improve performance of the collision avoidance system.

(Modifications)

Figure 8:
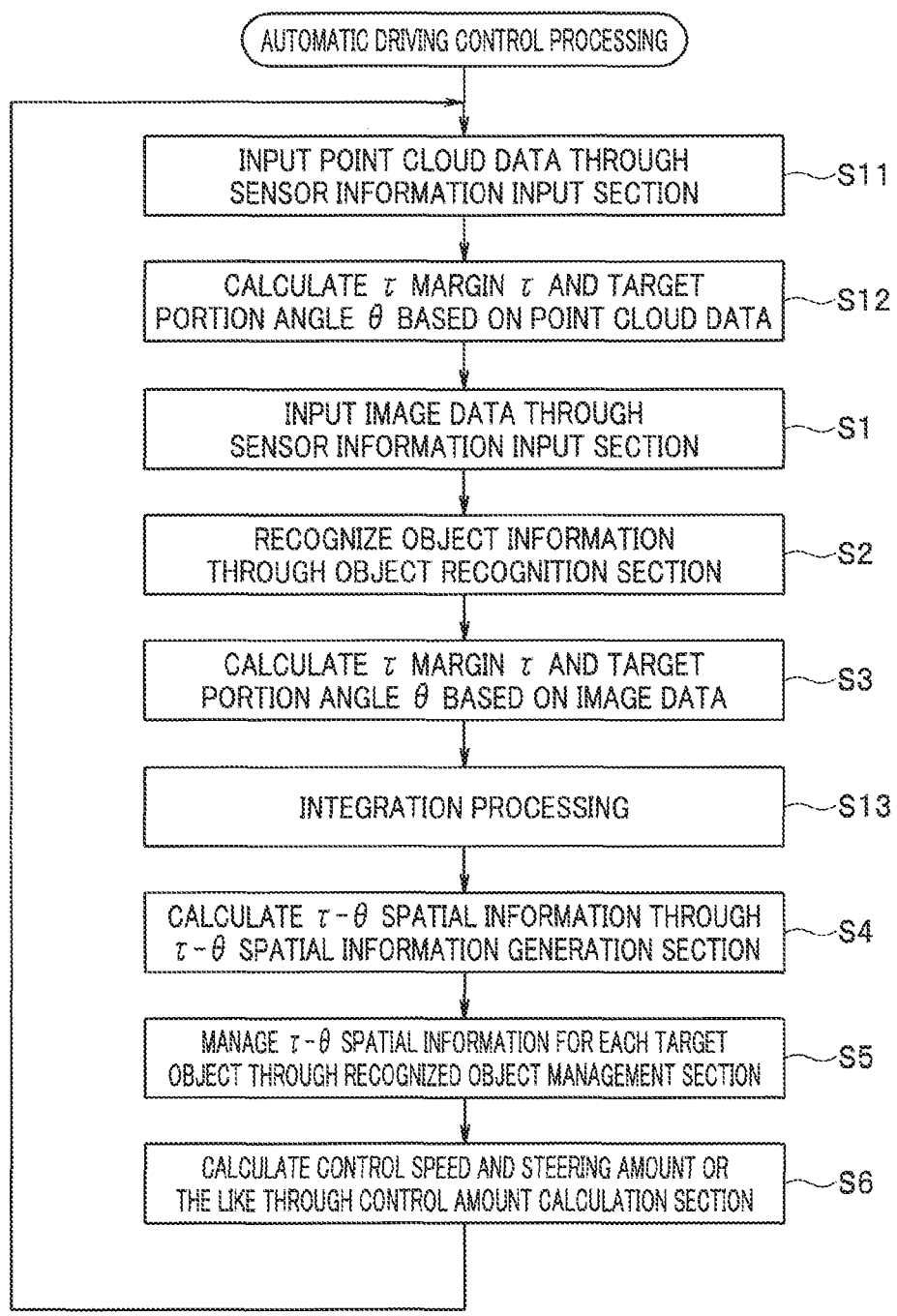
FIG. 8 is a flowchart illustrating an operation flow adopted in a modification.
Figure 9:
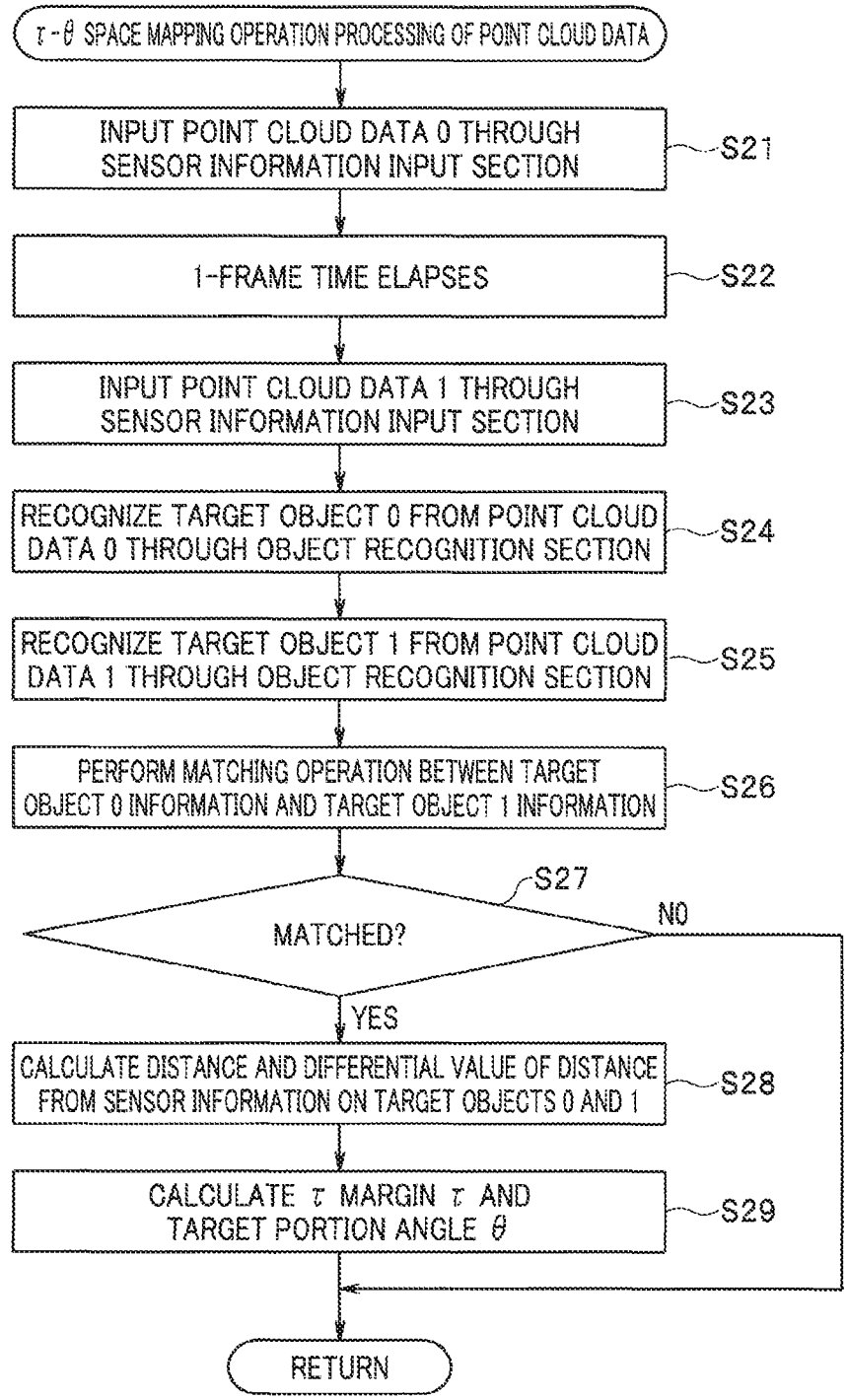
FIG. 9 is a flowchart illustrating specific processing of processes in S11 and S12 in FIG. 8.

FIG. 8 is a flowchart illustrating operation adopted in a modification. In FIG. 8, the same steps as those in FIG. 7 are assigned the same reference numerals and description of those steps is omitted. FIG. 9 is a flowchart illustrating specific steps in S11 and S12 in FIG. 8. The present modification will describe an example where both a camera and a lidar apparatus are adopted as the sensor apparatus 21 in the collision avoidance system.

Figure 10:
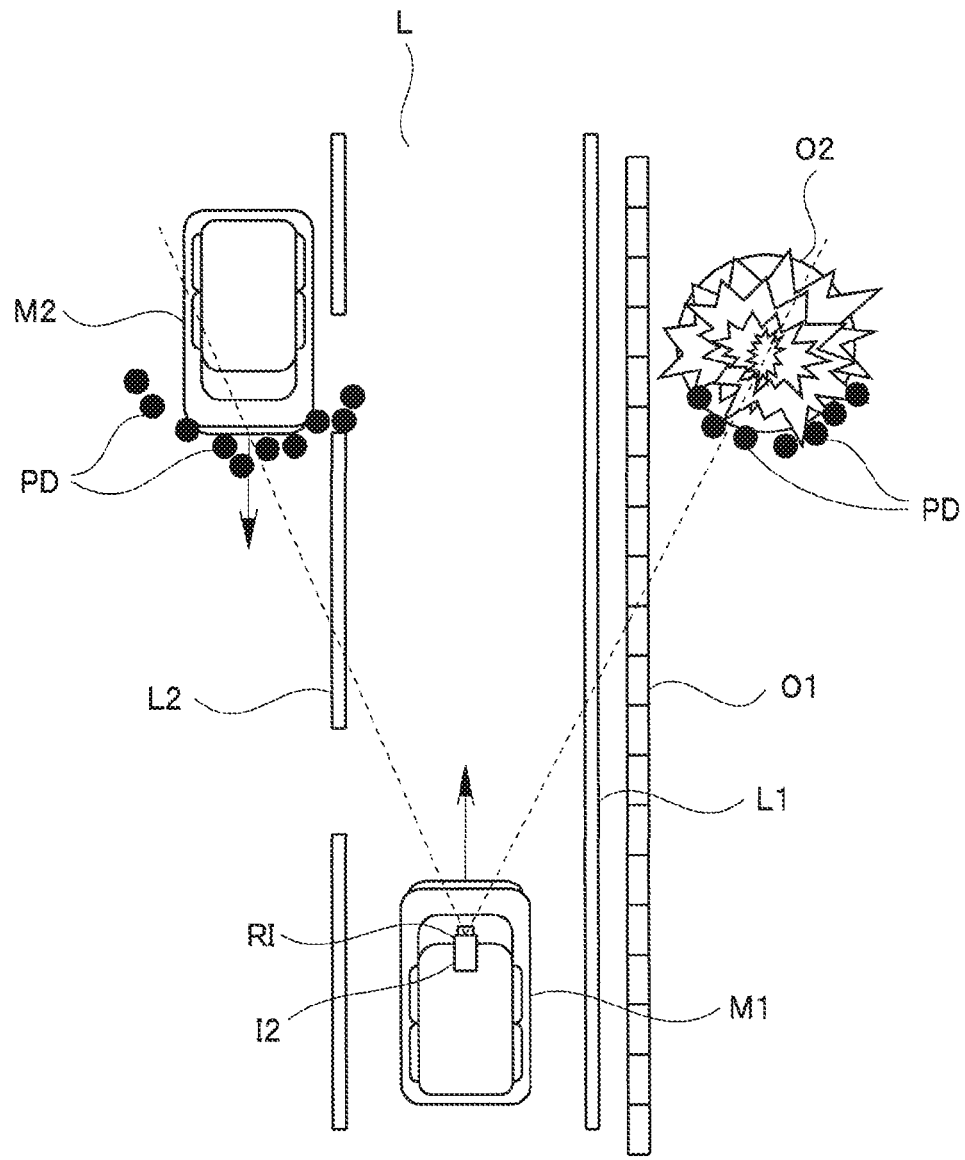
FIG. 10 is explanatory diagram for describing point cloud data in a lidar apparatus.

FIG. 10 is a diagram for describing point cloud data in the lidar apparatus. The own vehicle M1 is provided with a lidar apparatus RI and a camera I2. The camera I2 outputs an image picked up of a forward region of the own vehicle M to the sensor information input section 2. The lidar apparatus RI irradiates a target object with pulsed laser, measures scattered light from the target object, and can thereby calculate a distance to and an angle of the target object. In FIG. 10, the position of the target object detected by the lidar apparatus RI is represented by black bullet point cloud data PD. The lidar apparatus RI outputs the acquired point cloud data PD to the sensor information input section 2.

The sensor information input section 2 outputs the sensor information from the lidar apparatus RI and the camera I2 to the object recognition section 3. The object recognition section 3 outputs information on the target object recognized based on the sensor information to the $\tau$ and $\theta$ calculation section 4.

The $\tau$ and $\theta$ calculation section 4 calculates a $\tau$ margin $\tau$ and a target portion angle $\theta$ of the target object based on the sensor information. The $\tau$ and $\theta$ calculation section 4 uses the $\tau$ margin and the target portion angle as an integrated unit. For example, the $\tau$ and $\theta$ calculation section 4 may use the calculated $\tau$ margin and target portion angle only when it is determined that the calculation result is consistent through matching operation between the $\tau$ margin and the target portion angle obtained according to the sensor information of the lidar apparatus RI and the sensor information of the camera I2.

Furthermore, the $\tau$ and $\theta$ calculation section 4 may also calculate the $\tau$ margin and the target portion angle using sensor information that integrates the sensor information of the lidar apparatus RI and the sensor information of the camera I2. For example, the τ and θ calculation section 4 may correct the sensor information of the lidar apparatus RI with the sensor information of the camera I2, and then calculate the τ margin and the target portion angle. In this case, the τ and θ calculation section 4 can adopt a publicly known technique such as SfM.

In such a modification, in S11 in FIG. 8, the sensor information input section 2 receives the point cloud data from the lidar apparatus RI. Next, the object recognition section 3 and the τ and θ calculation section 4 calculate the τ margin and the target portion angle (S12).

More specifically, as shown in S21 in FIG. 9, the sensor information input section 2 receives point cloud data 0. The sensor information input section 2 waits for a one-frame period of image pickup by the camera I2 (S22), and then receives point cloud data 1 (S23). The object recognition section 3 recognizes the target object based on the point cloud data 0 (S24). The object recognition section 3 may recognize not only a specific object such as a person or vehicle but also non-specific object such as a point, line or rectangle, and designates the object obtained through object recognition processing as a target object 0. Next, the object recognition section 3 recognizes an object based on the point cloud data 1 (S25). The object obtained through the object recognition processing is designated as a target object 1. The object recognition section 3 performs matching operation on information on the target objects 0 and 1 (S26). For example, the object recognition section 3 determines whether or not the objects are identical objects through matching operation regarding the shapes and sizes of the target objects 0 and 1. For example, the object recognition section 3 may perform matching using a known technique such as ICP (iterative closest point). Note that the matching target may not be a specific object such as an arbitrary point or line instead of a specific object such as a person or vehicle.

When it is determined through a matching operation that the target objects 0 and 1 are identical objects, the object recognition section 3 outputs the sensor information of the target objects 0 and 1 to the τ and θ calculation section 4. The τ and θ calculation section 4 calculates a distance from the own vehicle to the target object 1 and a differential value of the distance based on the sensor information of the target objects 0 and 1 (S28). The τ and θ calculation section 4 calculates a s margin from the distance and the differential value of the distance and calculates a target portion angle from the sensor information of the target object 1 (S29).

On the other hand, the sensor information of the camera I2 is inputted to the sensor information input section 2 in S1 in FIG. 8. The τ margin and the target portion angle are calculated based on the sensor information of the camera I2 (S2, S3).

The τ and θ calculation section 4 integrates the τ margin and the target portion angle calculated based on the sensor information from the lidar apparatus RI and the camera I2 (S13). The integrated τ margin and target portion angle is supplied to the τ-θ space generation section 5.

Note that when matching is applied to a specific object such as a person or vehicle using the camera I2 and the lidar apparatus RI as the integration technique, one of the results of the camera I2 and the lidar apparatus RI may be adopted with higher priority based on the magnitude of noise, for example. At places where matching is not achieved, both results may be displayed or only portions in which both results match may be displayed. Furthermore, when mapping is performed to the τ-θ space, the output of each sensor may be multiplied by an arbitrary probability distribution as another integration technique. According to this technique, portions mapped by a plurality of sensors have a higher probability of existence. Furthermore, the recognized object management section 11 may be caused to perform management on the assumption that objects are located at places where the probability of existence reaches or exceeds a threshold. The rest of operation is similar to the operation in the example in FIG. 1.

Thus, in the modification, the τ margin and the target portion angle are calculated based on the sensor information of the lidar apparatus RI and the sensor information of the camera I2, and calculations can be carried out with higher accuracy than calculations using the sensor information of either one.

(Modification 2)

Figure 11:
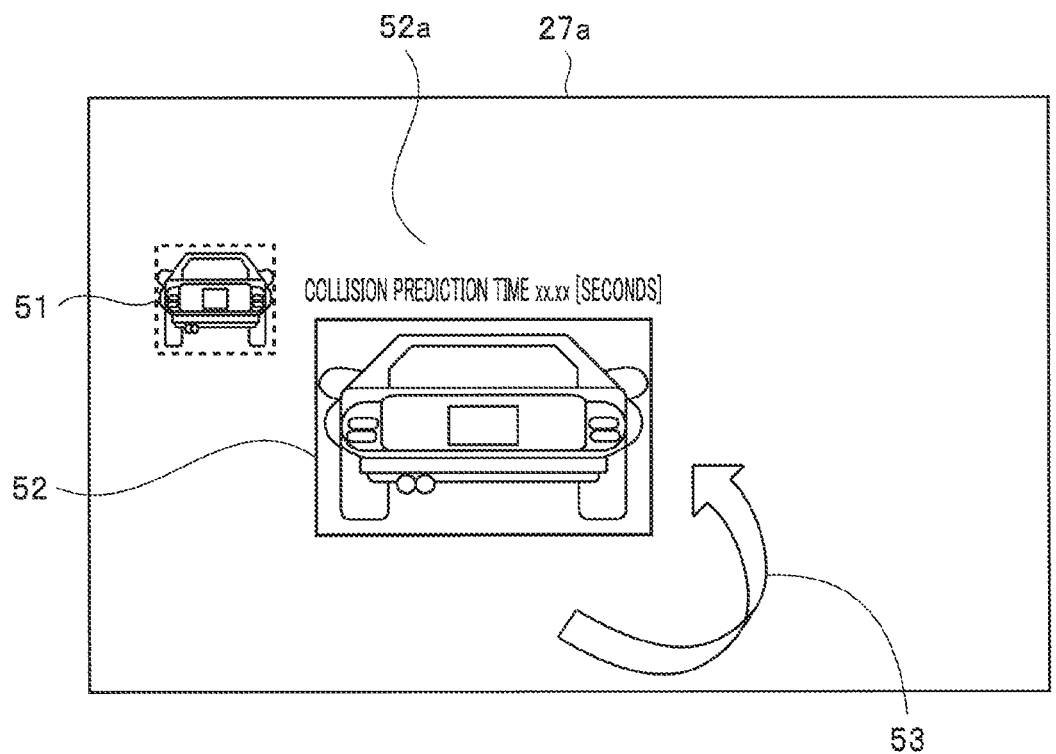
FIG. 11 is an explanatory diagram illustrating a display adopted in a modification.

FIG. 11 is a diagram illustrating an example of a display screen of a monitor according to modification 2. The monitor 27 can display information on a target object located within a collision range using an output signal from the control amount calculation section 12. On a display screen 27a in FIG. 11, two automobiles, which are target objects, are displayed enclosed by different frames 51 and 52. The frames surrounding the respective target objects are displayed in different display modes, different colors, lines and thicknesses or the like according to the length of the collision prediction time. The frame 51 shows, using a dotted line, that the vehicle is not located within a collision range and the frame 52 shows, using a thick solid line, that the vehicle is located within a collision range.

For the target object located within the collision range, information on the collision prediction time and collision avoidance measures may be displayed in the vicinity of the display. The example in FIG. 11 shows that a collision prediction time 52a until a collision with the vehicle in the frame 52 is xx.xx seconds and a steering instruction display 53 for instructing that it is recommended to turn the steering wheel to the right. Note that when the target object is located within the collision range, the monitor 27 may generate a warning sound. With the warning sound and the display, the driver can recognize that there exists a target object having a possibility of collision and recognize the operation or the like to avoid the collision from the display or voice.

Note that for a target object, the collision prediction time of which is equal to or greater than a predetermined time, the display of the collision prediction time may be omitted. Furthermore, information on the steering angle necessary to avoid the collision may also be displayed in addition to the steering instruction display 53. Furthermore, when the product of the area of the inside of the frame and the collision prediction time until the frame collides with the target object exceeds a predetermined threshold, the display mode of the whole display screen 27a may be changed by determining that the danger of collision is increased. For example, the brightness of display may be changed in a constant cycle.

In the modification 2, it is possible, through the monitor, to cause the driver to surely recognize the danger of collision and further contribute to safe driving.

(Modification 3)

Figure 12:
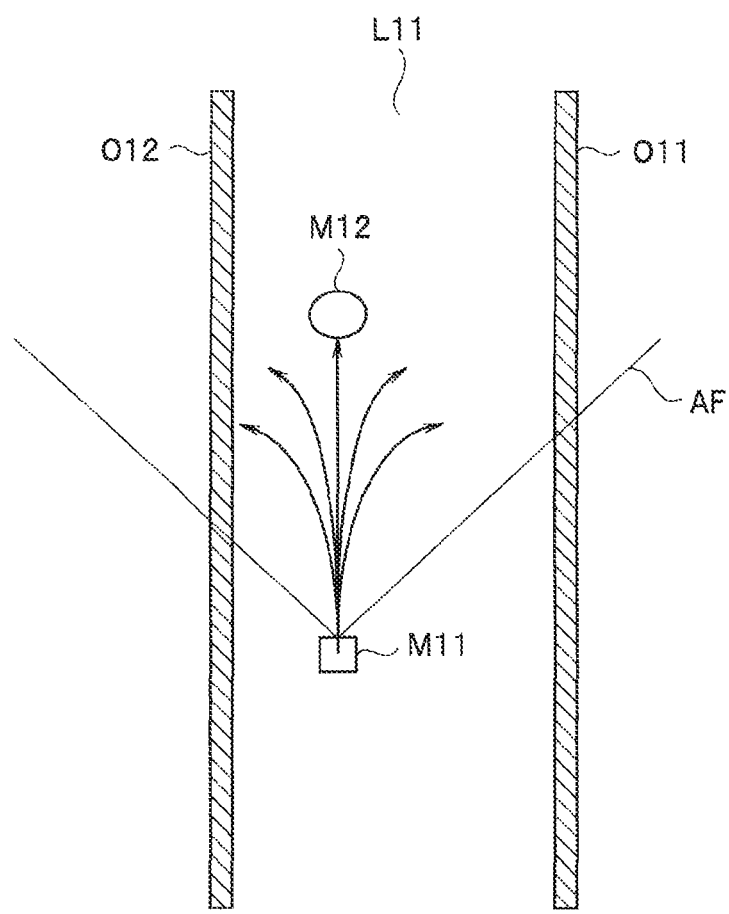
FIG. 12 is an explanatory diagram for describing a modification.
Figure 13:
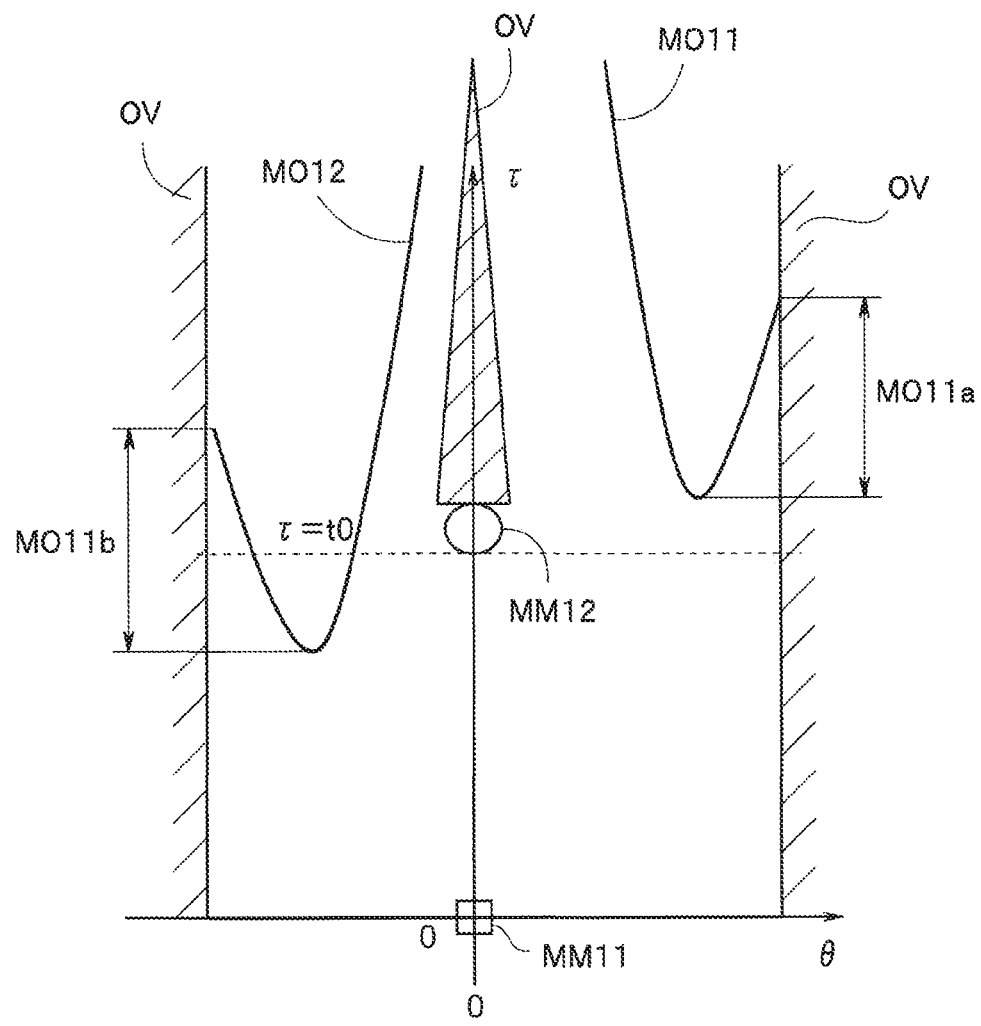
FIG. 13 is an explanatory diagram for describing a modification.

FIG. 12 to FIG. 18 are diagrams for describing modification 3. FIG. 12 illustrates an XY space (metric space) for describing a situation around the own vehicle. FIG. 13 illustrates a τ-θ space based on sensor information acquired by the camera of the own vehicle M11 in FIG. 12.

The example in FIG. 12 illustrates a situation of the own vehicle M11 running along a traveling lane L11 demarcated by lane boundaries O11 and O12 such as a wall or center line. There is an obstacle M12 staying still on the traveling lane L11 in the traveling direction of the own vehicle M11.

Note that the obstacle M12 may also be another vehicle, the speed of which becomes negative relative to the own vehicle M11. The own vehicle M11 can travel not only toward the linear traveling direction but also rightward or leftward by turning the steering wheel as shown by arrows.

In the τ-θ space in FIG. 13, the own vehicle M11 is shown at a position of r=0 as an own vehicle MM11. The obstacle M12 is shown at a position of τ=t0 as an obstacle MM12. The lane boundaries O11 and O12 are shown as lane boundaries MO11 and MO12, respectively. Note that minimum points τ11 and τ12 of the lane boundaries MO11 and MO12 indicate time points at which the own vehicle MM11 arrives at the lane boundaries MO11 and MO12 the earliest. That is, the minimum points τ11 and r12 indicate collision prediction times when the own vehicle M11 travels in directions orthogonal to the lane boundaries O11 and O12 relative to the current traveling direction, respectively. Note that ranges MO11a and MO11b correspond to ranges of the collision prediction times. The shaded area indicates an unknown region OV, images of which are not picked up because it is outside an angle of view AF of the camera or it is blocked by the obstacle MM12.

When the control amount calculation section 12 recognizes, based on the output of the recognized object management section 11, that the own vehicle MM11 will collide with the obstacle MM12 in t0 seconds, the control amount calculation section 12 sets an arrival target position so that the own vehicle MM11 avoids a collision with the obstacle MM12 t0 seconds later.

Figure 14:
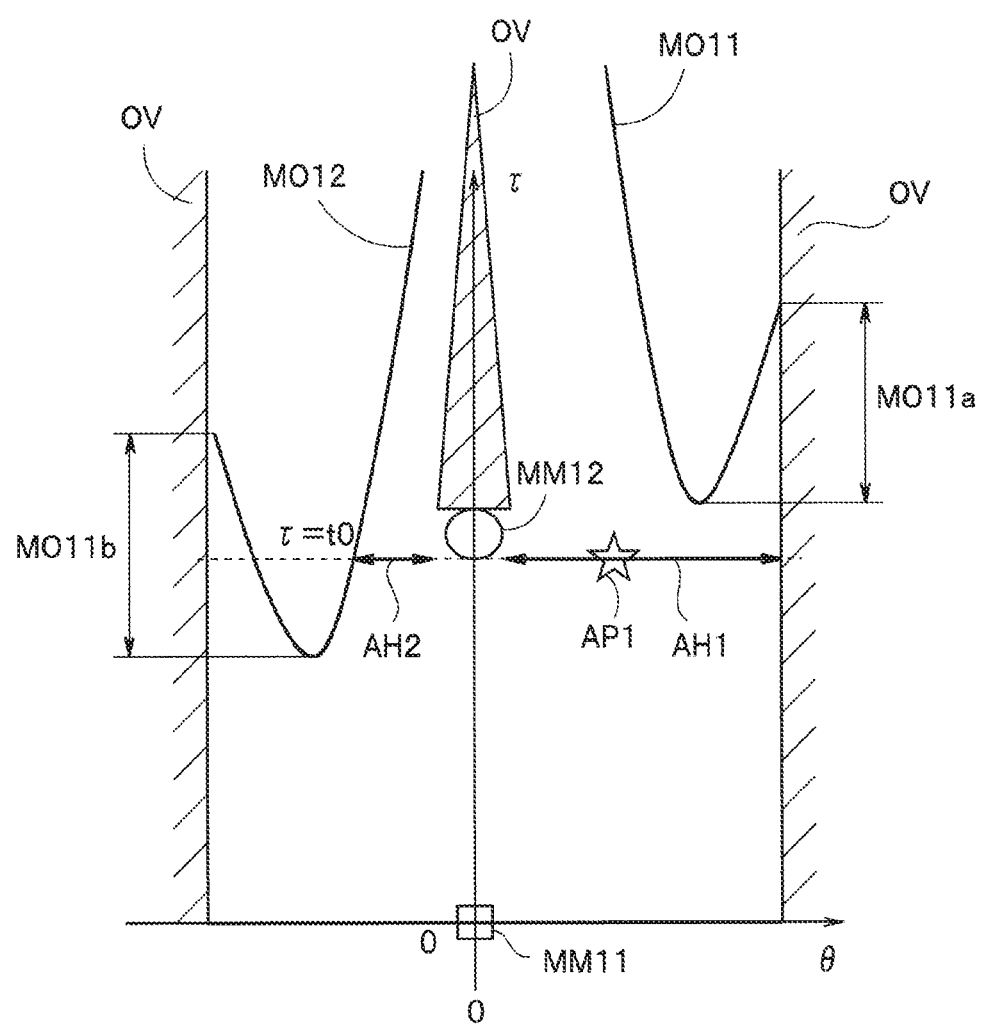
FIG. 14 is an explanatory diagram for describing a modification.

As shown in FIG. 14, angles in a yaw angle direction settable as the arrival target position at the position of τ=t0 (hereinafter referred to as "settable yaw angles") are represented by ranges AH1 and AH2. The control amount calculation section 12 sets a yaw angle at center positions on the ranges AH1 and AH2 (arrival target yaw angle) where a circle with a maximum diameter does not contact either the target object or the unknown region OV. In the example in FIG. 14, an arrival target yaw angle AP1 is shown by an asterisk. The control amount calculation section 12 may set the arrival target yaw angle at a midpoint of a greater range of the settable yaw angles.

Figure 15:
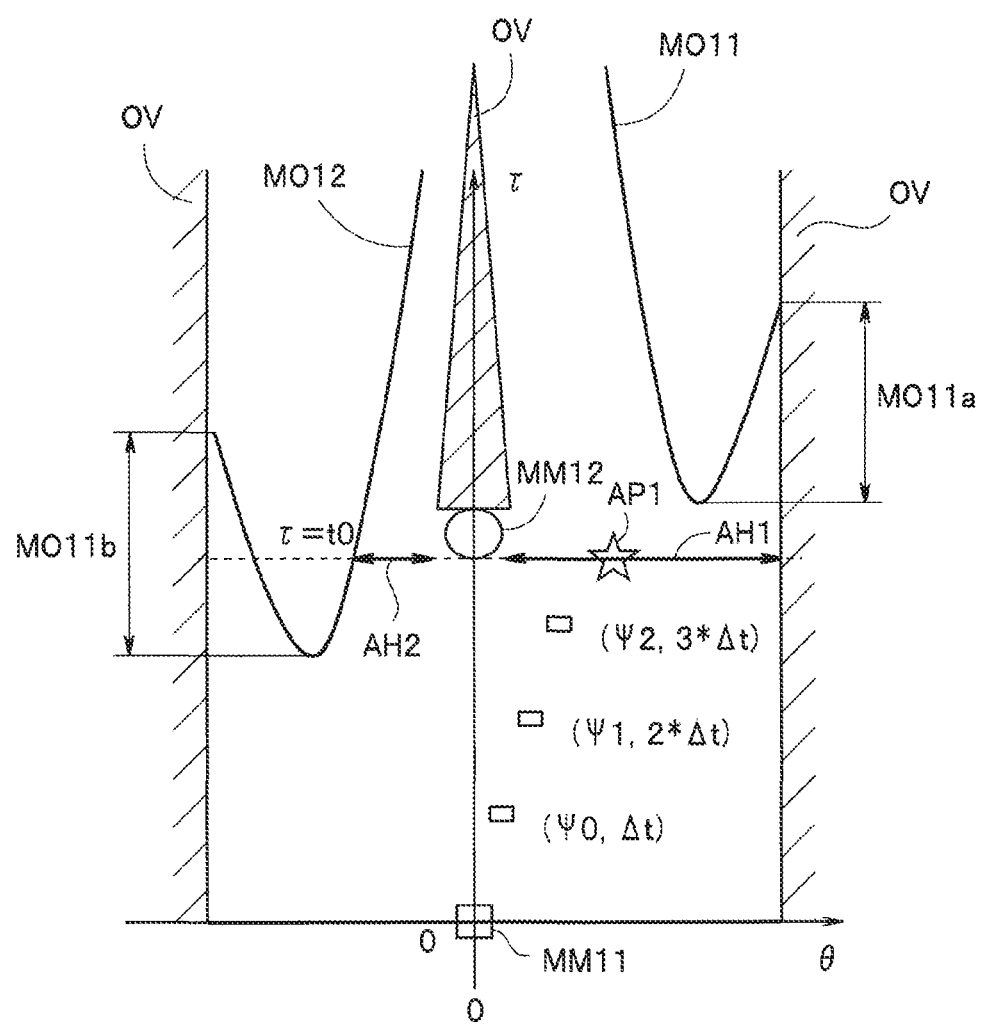
FIG. 15 is an explanatory diagram for describing a modification.

Next, the control amount calculation section 12 sets a yaw angle at every predetermined interval Δt seconds in order to reach the arrival target yaw angle AP1. The example in FIG. 15 shows yaw angles Ψ0 to Ψ2 (rectangular marks) set Δt seconds later, 2×Δt seconds later and 3×Δt seconds later from the present time.

Furthermore, the control amount calculation section 12 estimates a τ-θ space after a predetermined time elapses, and can thereby improve the certainty of collision avoidance. The obstacle MM12 which has a negative speed relative to the own vehicle MM11 has a size that increases in the yaw angle direction in the τ-θ space with the passage of time.

Figure 16:
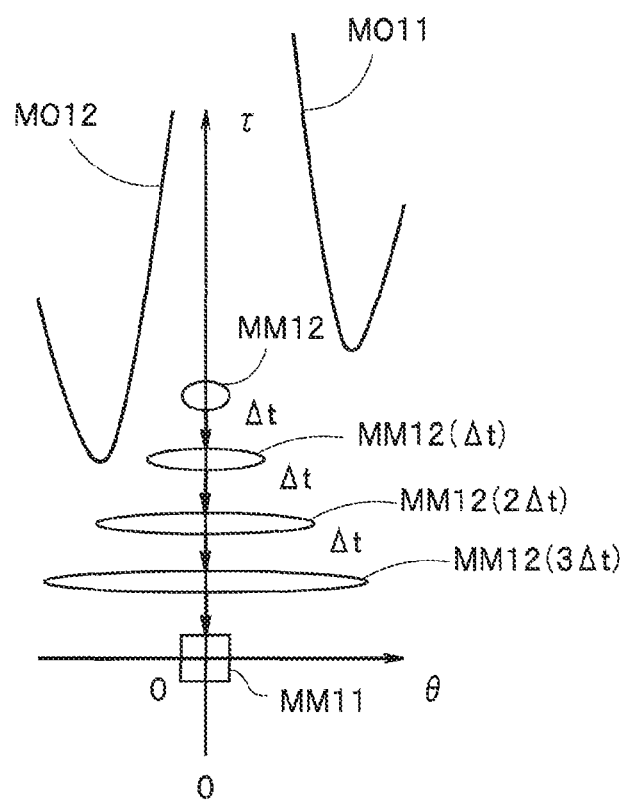
FIG. 16 is an explanatory diagram for describing a modification.

FIG. 16 illustrates a change in size of the obstacle MM12 in the τ-θ space at every Δt seconds. The τ-θ space in FIG. 16 can be estimated by executing affine transformation A (τ, θ) at every τ and θ. Note that the affine transformation A (τ, θ) becomes mapping that differs from one position to another in the τ-θ space (pixel unit or predetermined block unit). Since the size of the obstacle MM12 in the τ-θ space increases with the passage of time, the control amount calculation section 12 sets a yaw angle at every predetermined interval Δt seconds until reaching the arrival target yaw angle AP1 in consideration of a time variation of the size of the obstacle MM12. This allows the own vehicle M11 to surely avoid the danger of colliding with the obstacle M12.

The description in FIG. 13 to FIG. 16 has not taken into consideration the length (depth) of the obstacle M12. For this reason, even when the arrival target yaw angle AP1 is reached t0 later, there is a possibility that a collision with the obstacle M12 may occur thereafter. Images of the length of the obstacle M12 cannot be picked up by the camera. That is, the depth of the obstacle MM12 exists within the unknown region OV in the τ-θ space. Therefore, the control amount calculation section 12 assumes the length of the obstacle MM12 to be t1 on the scale of the collision prediction time and sets an arrival target yaw angle AP2 at a position of τ=t0+t1.

Figure 17:
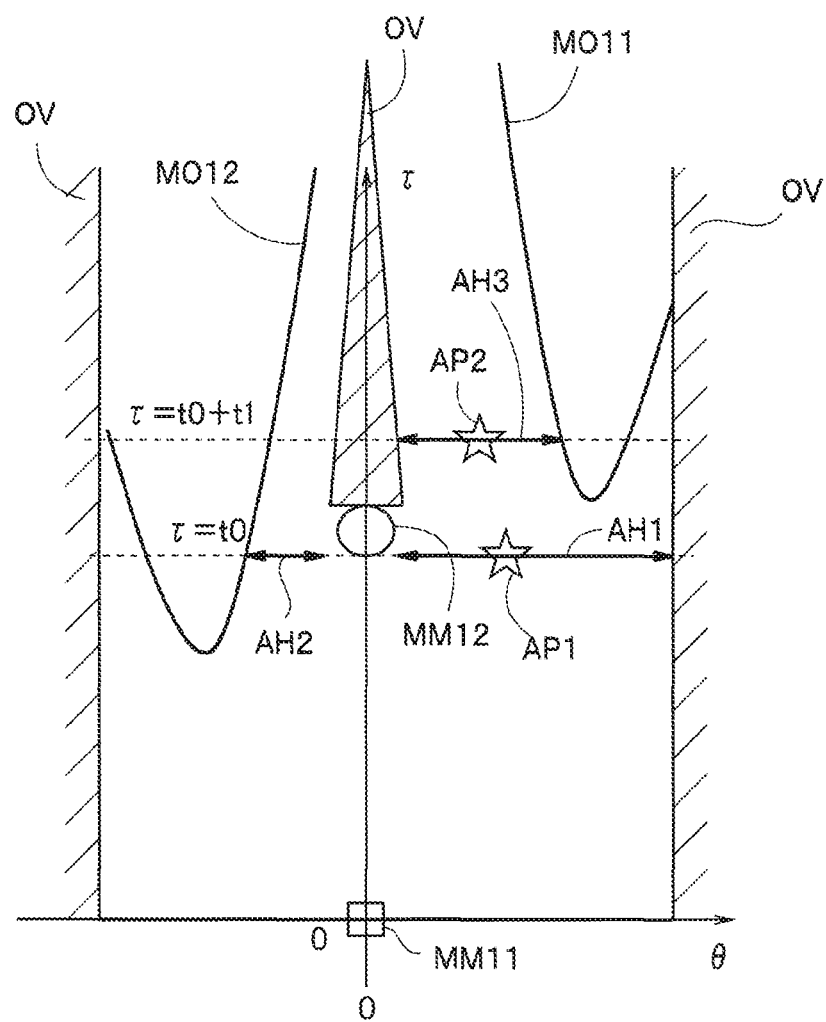
FIG. 17 is an explanatory diagram for describing a modification.

FIG. 17 is a diagram for describing the arrival target yaw angle AP2. At the position of t=t0+t1, the settable yaw angle is expressed by a range AH3. The control amount calculation section 12 sets a yaw angle (arrival target yaw angle AP2) at a center position in the range AH3 where it is possible to obtain a circle with a maximum diameter which does not contact either the target object or the unknown region OV. Note that the control amount calculation section 12 may set the arrival target yaw angle at a midpoint of the range AH3.

Note that to determine the arrival target yaw angle AP2 after the time t0+t1 elapses, the control amount calculation section 12 executes affine transformation A (τ, θ) for performing translation or rotation in the τ-θ space and thereby estimates the τ-θ space when the origin is moved after an elapse of t0.

The control amount calculation section 12 determines the steering angle at a predetermined time interval so as to reach the arrival target yaw angles AP1 and AP2. Reliable collision avoidance is achieved in this way.

When the length of the unknown region OV in the time axis direction differs, the range AH3 in FIG. 17 changes. Therefore, when calculating the arrival target yaw angle AP2, it is possible to calculate the control amount more accurately by setting the length of the unknown region OV in the time axis direction as appropriate. For example, the length of the unknown region OV in the time axis direction may be set as the length of the obstacle MM12.

Figure 18:
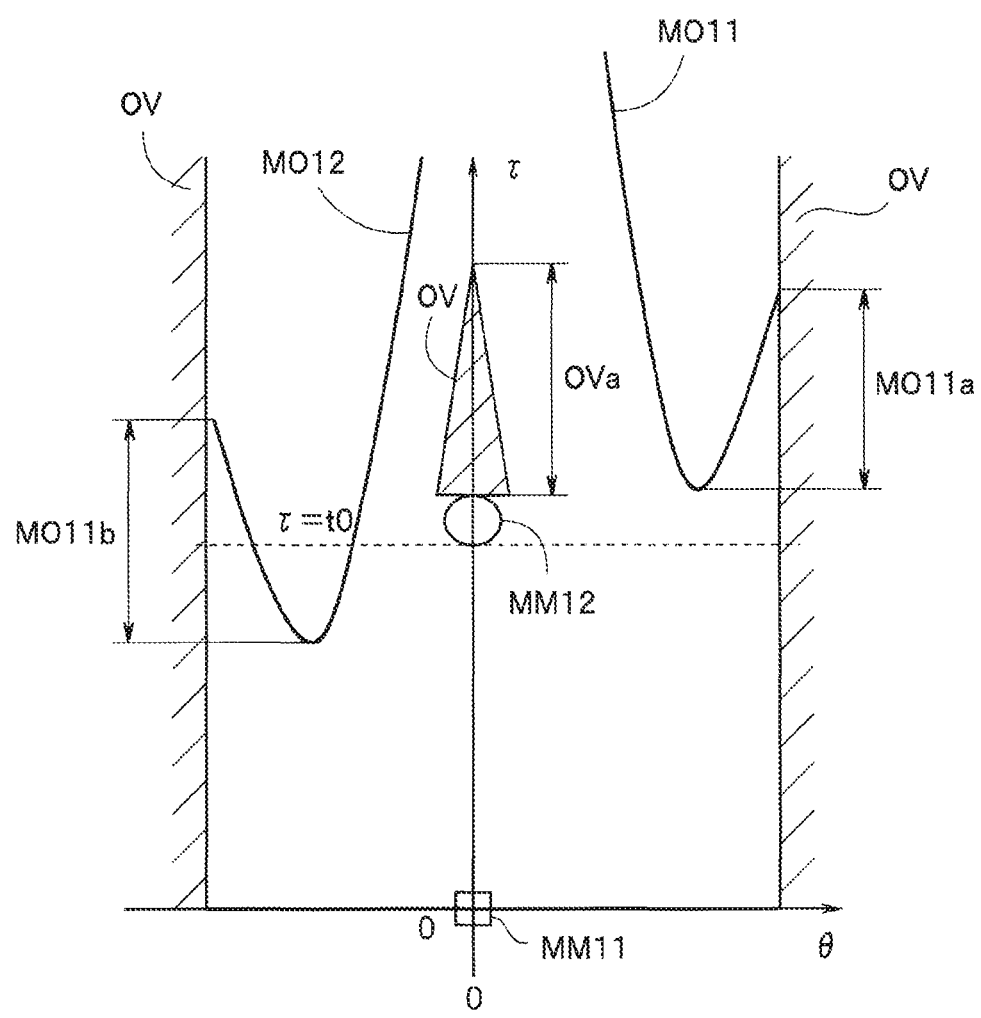
FIG. 18 is an explanatory diagram for describing a modification.

FIG. 18 is a diagram for describing the unknown region OV in this case. A length OVa of the unknown region OV in the time axis direction shown in FIG. 18 is obtained by estimating the length of the obstacle MM12. The object recognition section 3 can also determine the vehicle type of the target object such as an automobile, tractor or bus based on, for example, the shape of a top view of the vehicle. The object recognition section 3 may cause the memory to store a relationship between the shape and the length of the top view of a vehicle and the control amount calculation section 12 can set the length OVa of the obstacle MM12 by referencing the memory. This makes it possible to improve the accuracy of calculating the arrival target yaw angle AP2 and realize more reliable collision avoidance.

Second Embodiment

Figure 19:
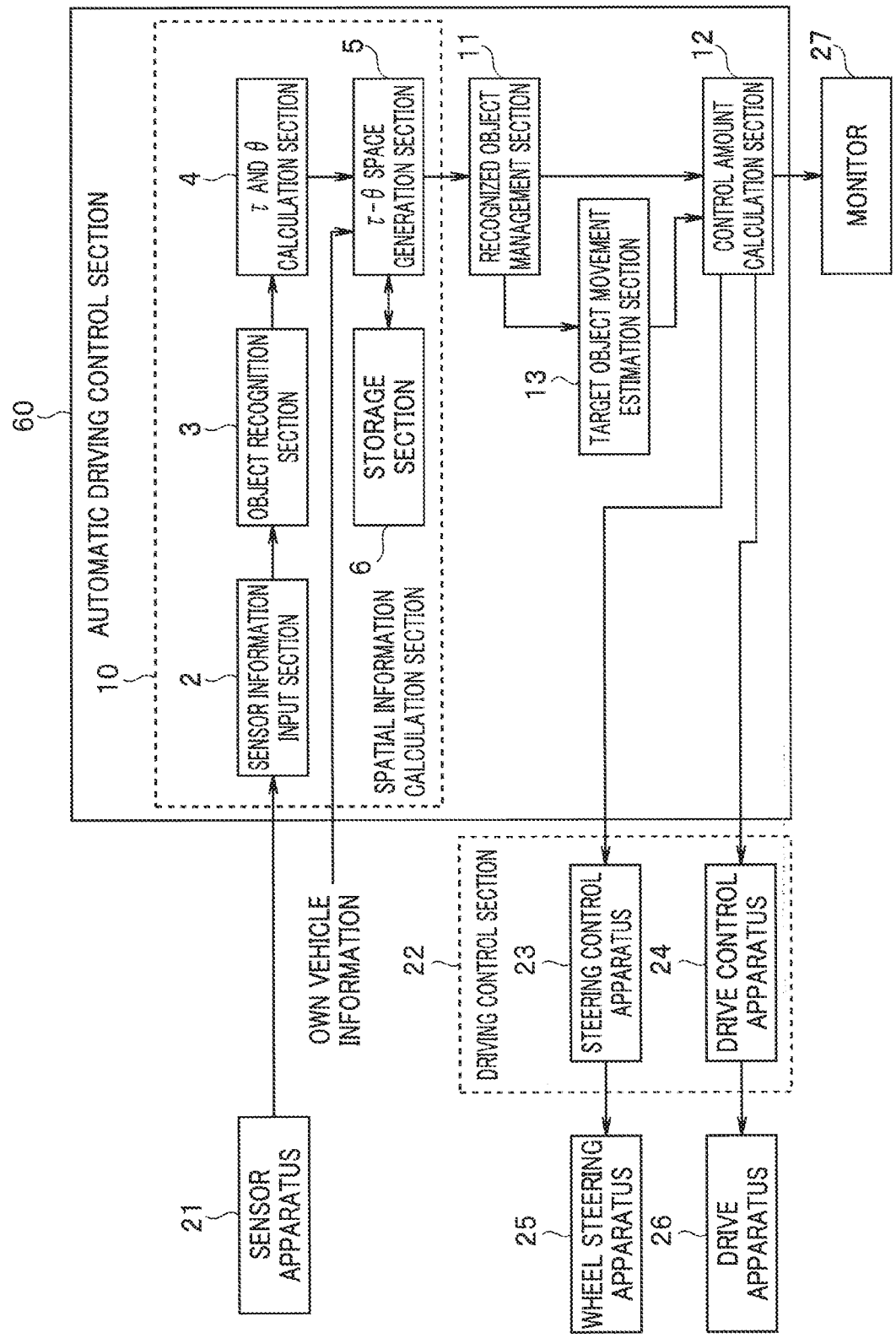
FIG. 19 is a block diagram illustrating a second embodiment.

FIG. 19 is a block diagram illustrating a second embodiment. In FIG. 19, the same components as those in FIG. 1A are assigned the same reference numerals and description of those components is omitted. The τ-θ space in the first embodiment includes position information of other vehicles with respect to the own vehicle, but includes no movement information of the other vehicles. For this reason, it may be impossible to determine whether or not the other vehicle is likely to collide with the own vehicle until the other vehicle falls within the collision range of the own vehicle. Moreover, full performance of path planning may not be achieved. Therefore, the present embodiment improves the performance of path planning in the control amount calculation section 12 by determining the movement of a target object.

The present embodiment is different from the first embodiment in that an automatic driving control section 60 to which a target object movement estimation section 13 is added is adopted instead of the automatic driving control section 20. The target object movement estimation section 13 supplies a result of estimating a movement of a target object based on the output of the recognized object management section 11 to the control amount calculation section 12. The control amount calculation section 12 executes path planning using the output of the recognized object management section 11 and the estimation result of the target object movement estimation section 13.

Note that the target object movement estimation section 13 may estimate the movement of the target object using not only the output of the recognized object management section 11 but also the own vehicle information.

Figure 20:
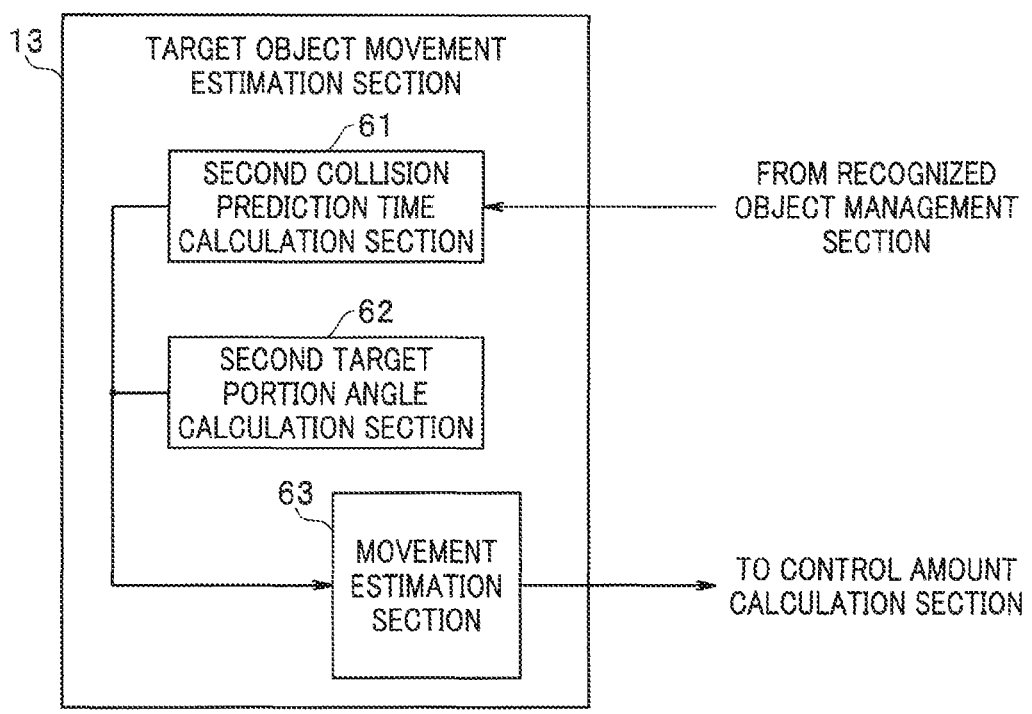
FIG. 20 is a block diagram illustrating an example of a specific circuit configuration of the target object movement estimation section 13 in FIG. 19.

FIG. 20 is a block diagram illustrating an example of a specific circuit configuration of the target object movement estimation section 13. The target object movement estimation section 13 includes a second collision prediction time calculation section 61 and a second target portion angle calculation section 62. The second collision prediction time calculation section 61 differentiates the T margin from the recognized object management section 11, calculates a predicted value $\tau e$ of the $\tau$ margin after a predetermined time elapses and outputs the predicted value $\tau e$ to a movement estimation section 63. Furthermore, the second target portion angle calculation section 62 differentiates the target portion angle from the recognized object management section 11, calculates a predicted value $\theta e$ of the target portion angle after a predetermined time elapses and outputs the predicted value $\theta e$ to the movement estimation section 63.

The movement estimation section 63 outputs the result of estimating the movement of each target object using the $\tau$ margin and the predicted value $\tau e$ thereof, and the target portion angle and the predicted value $\theta e$ thereof to the control amount calculation section 12.

Figure 21:
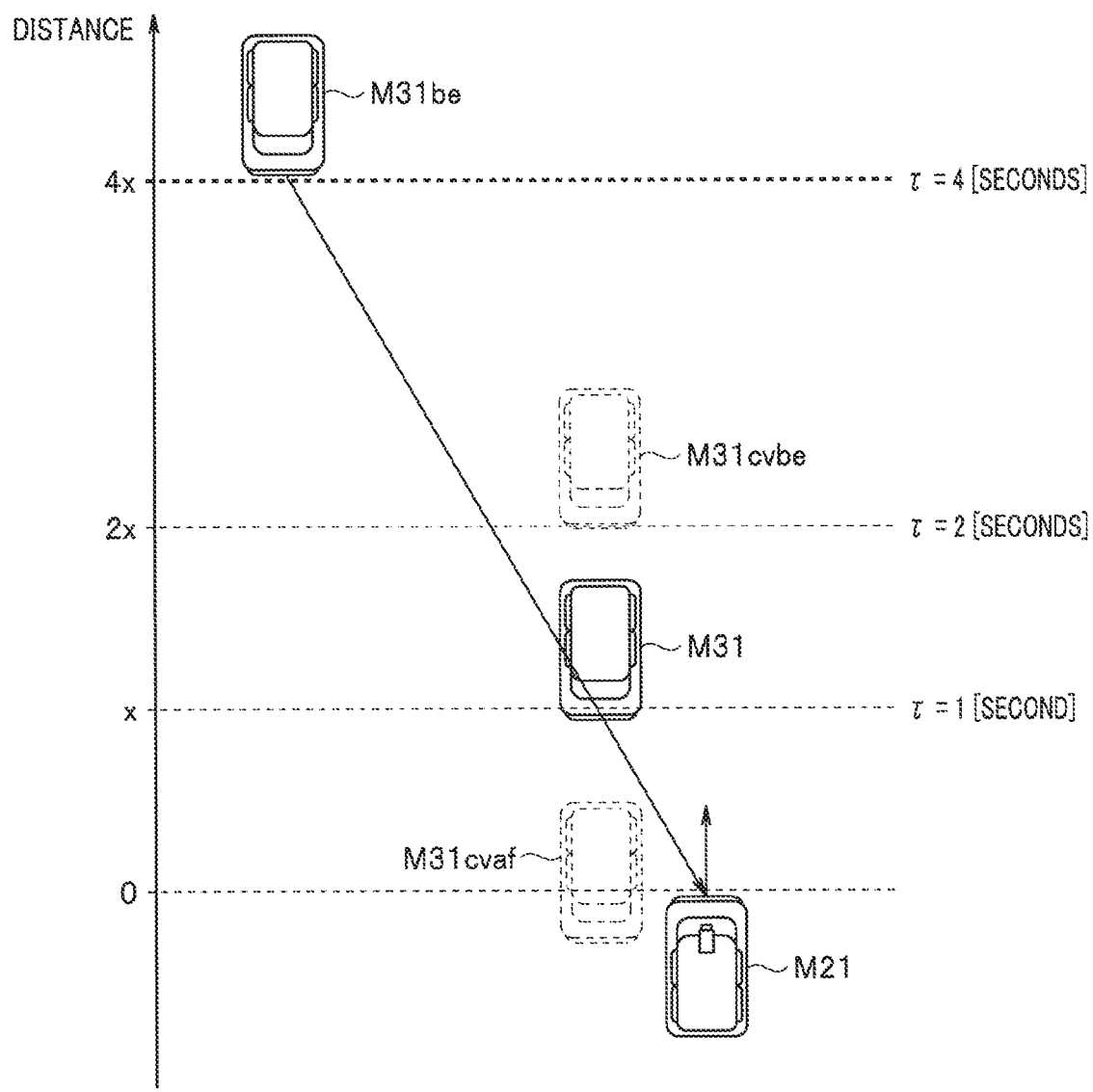
FIG. 21 is an explanatory diagram for describing operation of the second embodiment.

Next, operation of the present embodiment will be described with reference to FIG. 21 and FIG. 22. FIG. 21 is a diagram illustrating a positional relationship between the own vehicle M21 and the other vehicle M31 viewed from above. A vertical axis in FIG. 21 shows a distance and the own vehicle M21 travels straight in a direction parallel to the vertical axis. Furthermore, the other vehicle M31 travels in a direction toward the own vehicle M21.

Now, suppose that the latest $\tau$ margin calculated when the other vehicle M31 is located at a distance x is stored in the recognized object management section 11. For example, suppose the $\tau$ margin of the other vehicle M31 at the present time is 1 second. The position of the other vehicle M31 when the other vehicle M31 is in the state of uniform linear motion relatively parallel to the own vehicle M21 is shown by a broken line. When the movement of the target object is not estimated, uniform linear motion is assumed. In this case, the other vehicle M31 is estimated to be located at a distance 2× (M31$cvbe$) one second before and located at a position (M31$cvaf$) at which it passes by the own vehicle M21 one second later.

The other vehicle M31 located at a distance x at the present time is located at a position of distance 4× one second before the present time as shown in FIG. 21, and in this case, suppose the $\tau$ margin of the other vehicle M31$cvbe$ is calculated to be $\tau$=4 seconds. If the other vehicle M31 continues uniform linear motion, the other vehicle M31 is located at a position of $\tau$=3 seconds at the present time. However, the $\tau$ margin calculated at the present time is 1 second. Therefore, it can be seen that the other vehicle M31 is in the state of acceleration motion relative to the own vehicle M21 and has a possibility of colliding with the own vehicle M21 in a shorter time than when uniform linear motion is assumed.

Figure 22:
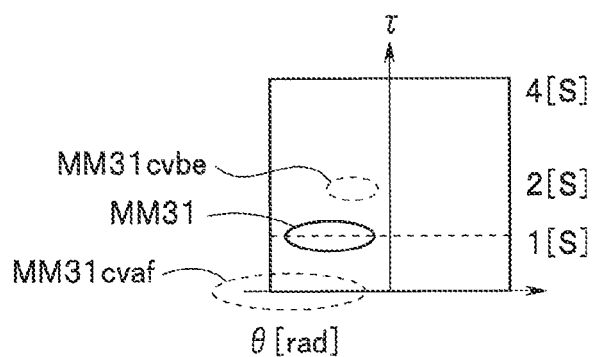
FIG. 22 is an explanatory diagram for describing operation of the second embodiment.

The other vehicle M31 is represented by "MM31" in FIG. 22. In the $\tau$-$\theta$ space, the size of a target object increases as the collision prediction time decreases. The other vehicle M31$cvbe$ is represented by "MM31$cvbe$" in FIG. 22. Furthermore, the other vehicle M31$cvaf$ is represented by "MM31$cvaf$" in FIG. 22. The other vehicle M31 is assumed to pass by the own vehicle M21 in an opposite direction parallel to the own vehicle M21. As the other vehicle M31 approaches the own vehicle M21, the target portion angle $\theta$ increases in the order of MM31$cvbe$, MM31, MM31$cvaf$.

Furthermore, the target portion angle of the other vehicle M31 at the present time is substantially equal to the target portion angle of the other vehicle M31 be one second before. That is, the target portion angle remains unchanged from one second before to the present time and it can be seen that the other vehicle M31 is advancing toward the own vehicle M21.

The target object movement estimation section 13 estimates such a movement of the target object by calculating, for example, predicted values $\tau e$ and $\theta e$ at a time different from the present time. The target object movement estimation section 13 supplies the result of estimating the movement of the other vehicle to the control amount calculation section 12. The control amount calculation section 12 controls the steering angle and the speed so that the own vehicle M21 does not collide with the other vehicle M31 based on outputs of the recognized object management section 11 and the target object movement estimation section 13.

The present embodiment estimates the movement of a target object according to, for example, $\tau$ margins at different times and predicted values thereof; and target portion angles and predicted values thereof. Path planning of the own vehicle is executed based on the $\tau$-$\theta$ spatial information and the movement estimation result. High accuracy path planning for avoiding a collision can be achieved in this way.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A mobile body spatial information calculation apparatus comprising:
   an input section configured to receive sensor information including information on one or more target objects based on a position of an own mobile body from a sensor apparatus;
   an object recognition section configured to recognize the target object based on the sensor information;
   a calculation section configured to calculate a collision prediction time and a target portion angle, the target portion angle being information on a direction in which the target object is located based on the own mobile body, based on the sensor information on the target object recognized by the object recognition section; and a spatial information generation section configured to generate spatial information according to the collision prediction time and the target portion angle using the collision prediction time and the target portion angle calculated by the calculation section and store the generated spatial information.

2. The mobile body spatial information calculation apparatus according to claim 1, wherein the target portion angle is expressed by an angle using a traveling direction of the own mobile body as a reference.

3. The mobile body spatial information calculation apparatus according to claim 1, wherein the spatial information generation section generates the spatial information including information on a range within which the own mobile body moves after a predetermined time elapses.

4. The mobile body spatial information calculation apparatus according to claim 1, wherein the sensor apparatus comprises at least one of an image sensor, a radar apparatus and a lidar apparatus.

5. The mobile body spatial information calculation apparatus according to claim 1, wherein the sensor information comprises image information, and the calculation section calculates the collision prediction time and the target portion angle based on a position on an image corresponding to the target object.

6. The mobile body spatial information calculation apparatus according to claim 1, wherein the sensor information comprises distance information from the own mobile body to the target object and information on an angle of the target object with respect to a traveling direction of the own mobile body, and the calculation section calculates the collision prediction time based on the distance information and calculates the target portion angle based on the angle information.

7. The mobile body spatial information calculation apparatus according to claim 6, wherein the sensor information further comprises image information, and the calculation section corrects the collision prediction time and the target portion angle based on the image information.

8. A collision avoidance system comprising:
the mobile body spatial information calculation apparatus according to claim 1; and
a control section configured to generate information for avoiding a collision with each one of the target objects based on the spatial information for each one of the target objects.

9. The collision avoidance system according to claim 8, further comprising a recognized object management section configured to manage the spatial information for each one of the target objects.

10. The collision avoidance system according to claim 9, wherein the control section generates information for generating a warning indicating that there is a possibility of collision as the information for avoiding the collision with each one of the target objects.

11. The collision avoidance system according to claim 10, further comprising a display section configured to perform a display based on the information for generating the warning.

12. The collision avoidance system according to claim 11, wherein the display section displays the target object in association with the collision prediction time.

13. The collision avoidance system according to claim 9, wherein the control section generates information for controlling at least one of a speed and a traveling direction to avoid a collision as the information for avoiding the collision with each one of the target objects.

14. The collision avoidance system according to claim 13, wherein the control section sets an arrival target position between the respective target objects and calculates an arrival target setting yaw angle of the own mobile body necessary to reach the arrival target position.

15. The collision avoidance system according to claim 14, wherein the control section calculates the arrival target setting yaw angle in a predetermined time unit.

16. The collision avoidance system according to claim 14, wherein the control section estimates each one of the target objects which is not acquired from the sensor information and sets the arrival target position.

17. The collision avoidance system according to claim 14, wherein the control section calculates sizes of the target object in the space at different time points by affine transformation corresponding to the target object and sets the arrival target setting yaw angle for avoiding a collision with the target object.

18. The collision avoidance system according to claim 8, comprising a movement estimation section configured to estimate a movement of the target object based on spatial information managed by the recognized object management section, wherein the control section generates the information for avoiding the collision with each one of the target objects based on an output of the recognized object management section and an estimation result of the movement estimation section.

19. The collision avoidance system according to claim 18, wherein the movement estimation section calculates collision prediction times and target portion angles at different time points based on the spatial information managed by the recognized object management section, and estimates the movement of each one of the target objects.

* * * * *